(12) United States Patent
Buda et al.

(10) Patent No.: US 10,809,707 B2
(45) Date of Patent: *Oct. 20, 2020

(54) DETECTION OF EFFICIENCY DEGRADATION IN HVAC AND R SYSTEMS

(71) Applicant: Schneider Electric USA, Inc., Andover, MA (US)

(72) Inventors: Paul R. Buda, Raleigh, NC (US); Ian J. Lyttle, Iowa City, IA (US)

(73) Assignee: Schneider Electric USA, Inc., Boston, MA (US)

( * ) Notice: Subject to any disclaimer, the term of this patent is extended or adjusted under 35 U.S.C. 154(b) by 422 days.

This patent is subject to a terminal disclaimer.

(21) Appl. No.: 15/902,785

(22) Filed: Feb. 22, 2018

(65) Prior Publication Data
US 2019/0258237 A1 Aug. 22, 2019

(51) Int. Cl.
*G05B 23/02* (2006.01)
*F25B 49/00* (2006.01)
(Continued)

(52) U.S. Cl.
CPC .......... *G05B 23/0243* (2013.01); *F24F 11/38* (2018.01); *F24F 11/49* (2018.01);
(Continued)

(58) Field of Classification Search
CPC .......................... G05B 23/0243; G05B 17/02; G05B 23/0221; G05B 2219/2614; F25D 21/00; F25D 21/02; F24F 11/38; F24F 11/49; F24F 11/86; F24F 2140/12; F24F 2140/60; F25B 49/005; F25B 2500/19; F25B 2700/21161; F25B 2700/151
See application file for complete search history.

(56) References Cited

U.S. PATENT DOCUMENTS

| 4,495,779 A | 1/1985 | Tanaka et al. |
|---|---|---|
| 5,224,354 A | 7/1993 | Ito et al. |

(Continued)

FOREIGN PATENT DOCUMENTS

| WO | 2009/038624 | 3/2009 |
|---|---|---|

OTHER PUBLICATIONS

"How is Electricity used in US Homes", US Energy Information Administration, downloaded at https:www.eia.gov/tools/faqs/faq.php?id=96&t=3.

(Continued)

*Primary Examiner* — Emmanuel E Duke
(74) *Attorney, Agent, or Firm* — Locke Lord LLP

(57) ABSTRACT

An HVAC&R monitor detects short-term and long-term system efficiency degradations by modeling either compressor input power or current. The model is continuously updated with new or recent temperature and power parameter measurements reflecting the most up-to-date operating condition of the system. Short-term system degradations are detected instantaneously by comparing compressor power or current as predicted by the model against measured power or current usage. Long-term system degradations are detected over time by monitoring the sensitivity of the compressor power or current usage to evaporator and/or condenser fluid temperatures. An appropriate warning and/or signal may be issued if system efficiency degradation is detected.

20 Claims, 9 Drawing Sheets

(51) Int. Cl.
*G05B 17/02* (2006.01)
*F24F 11/38* (2018.01)
*F24F 11/49* (2018.01)
*F24F 140/12* (2018.01)
*F24F 140/60* (2018.01)

(52) U.S. Cl.
CPC ............ *F25B 49/005* (2013.01); *G05B 17/02* (2013.01); *G05B 23/0221* (2013.01); *F24F 2140/12* (2018.01); *F24F 2140/60* (2018.01); *F25B 2500/19* (2013.01); *F25B 2700/151* (2013.01); *F25B 2700/21161* (2013.01); *G05B 2219/2614* (2013.01)

(56) References Cited

U.S. PATENT DOCUMENTS

| | | | |
|---|---|---|---|
| 5,551,248 | A | 9/1996 | Derosier |
| 5,867,998 | A * | 2/1999 | Guertin ............... F25B 49/02 62/211 |
| 6,018,958 | A | 2/2000 | Lingelbach et al. |
| 6,571,566 | B1 | 6/2003 | Temple et al. |
| 6,631,617 | B1 | 10/2003 | Dreiman et al. |
| 6,708,508 | B2 | 3/2004 | Demuth et al. |
| 7,146,819 | B2 | 12/2006 | Demuth et al. |
| 7,191,608 | B2 * | 3/2007 | Yamasaki ............ F25B 9/008 62/229 |
| 7,600,390 | B2 | 10/2009 | Manole |
| 8,205,427 | B2 | 6/2012 | Schwarz et al. |
| 8,800,309 | B2 | 8/2014 | Buda et al. |
| 2004/0159113 | A1 | 8/2004 | Singh et al. |
| 2005/0235660 | A1 | 10/2005 | Pham |
| 2007/0163276 | A1 | 7/2007 | Braun et al. |
| 2011/0031911 | A1 * | 2/2011 | Marcinkiewicz ... H02M 1/4225 318/400.3 |
| 2014/0000291 | A1 | 1/2014 | Kates |
| 2014/0000292 | A1 | 1/2014 | Kates |
| 2014/0000293 | A1 | 1/2014 | Kates |
| 2015/0337831 | A1 * | 11/2015 | Zhou ...................... F04B 49/20 700/276 |

OTHER PUBLICATIONS

Annual Energy Outlook 2017, US Energy Information Administration, downloaded at www.eia.gov/aeo.
Written Opinion corresponding to International Patent Application No. PCT/US2010/059413, European Patent Office, dated Apr. 11, 2011.
International Search Report corresponding to International Patent Application No. PCT/US2010/059413, European Patent Office, dated Apr. 11, 2011.
Performance of a Residential Heat Pump Operating in the Cooling Mode with Single Faults Imposed, Applied Thermal Engineering 29(2009) 770-778, M. Kim, W. V. Payne, P. A. Domanski, S. Ho Yoon, C. J. L. Hermes, (Apr. 4, 2008).
Development of Refrigerant Charge Indicator and Dirty Air Filter Sensor, ORNL/CON-489, V.C. Mei, F.C. Chen, Z. Gao, Feb. 2003.
Virtual Refrigerant Pressure Sensors for Use in Monitoring and Fault Diagnosis of Vapor-Compression Equipment, vol. 15, No. 3., HVAC&R Research, H. Li, J. Braun, May 2009.
A Statistical, Rule-Based Fault Detection and Diagnostic Method for Vapor Compression Air Conditioners, vol. 3, No. 1, HVAC&R Research, T. Rossi, J. Braun, Jan. 1997.
Transient Characteristics of Split Air-Conditioning Systems Using R-22 and R-410A as Refrigerants, vol. 15, No. 3, HVAC&R Research, R. Kapadia, S. Jain, R. Agarwal, May 2009.

* cited by examiner

DETECTION OF EFFICIENCY DEGRADATION IN HVAC AND R SYSTEMS

CROSS-REFERENCE TO RELATED PATENT APPLICATIONS

This application is related in subject matter to and incorporates herein by reference commonly-assigned U.S. application Ser. No. 15/902,813 entitled "FROST DETECTION IN HVAC&R SYSTEMS" and having Reference No. CIT-0091-US, filed concurrently herewith.

FIELD OF THE INVENTION

The disclosed embodiments relate generally to heating, ventilating, and air conditioning and refrigeration (HVAC&R) systems and, more particularly, to detecting degradation of operational efficiency in such HVAC&R systems.

BACKGROUND OF THE INVENTION

HVAC systems, which may include residential and commercial heat pumps, air conditioning, and refrigeration systems, employ a vapor-compression cycle (VCC) to transfer heat between a low temperature fluid and a high temperature fluid. In many VCC based systems referred to as direct-exchange systems, the "fluid" is the air in a conditioned space or an external ambient environment. In other VCC based systems, including indirect-exchange systems such as chillers, geothermal heat pumps and the like, the fluid to and from which heat is exchanged may be a liquid such as water or an anti-freeze. These VCC based systems, also referred to herein as HVAC&R systems, are generally known in the art and employ a refrigerant as a medium to facilitate heat transfer.

VCC based systems are mechanically "closed" in that the refrigerant is contained within the mechanical confines of the system and there is a mechanical buffer where the heat is to be exchanged between the refrigerant and the external fluid(s). In these VCC based systems, the refrigerant circulates within the system, passing through a compressor, a condenser, and an evaporator. At the evaporator, heat is absorbed by the refrigerant from the space to be cooled in the case of an air conditioner or refrigerator or absorbed from the external ambient in the case of a heat pump. At the condenser, heat is rejected to the external ambient in the case of an air conditioner or refrigerator or to the space to be conditioned in the case of a heat pump.

Loss of refrigerant due to leakage is a well-known problem in such VCC based systems and can impair the ability of the system to transfer heat, potentially resulting in significant reduction of system efficiency. Compounding the problem, refrigerant leakage is typically a long-term event that typically occurs slowly over days, weeks, and months and is often not detected until after discomfort (in the case of air conditioning or heat pump systems) or spoilage (in the case of refrigeration systems) results or an unexpectedly large utility bill is received. In addition, many refrigerants that have been dispersed into the atmosphere due to leakage have been demonstrated to have detrimental effects on the earth's ozone layer.

Efficiency degradation may also result from short-term events and system malfunctions, often referred to as faults. Examples of short-term events may include freezing or frost build-up (notably in, but not limited to, direct-exchange systems). In an air conditioner, a frosted or frozen evaporator coil significantly reduces the cooling capacity of the system and is considered a system malfunction or fault. In a heat pump system or a refrigeration system, frost formation may be normal, but can be mitigated via a defrost cycle.

Faults in HVAC&R systems include rapid depressurization of refrigerant due to ruptures in refrigerant lines, seals, and heat exchangers (e.g., evaporator or condenser coils). In direct exchange systems faults include air handler fan malfunctions resulting from broken air handler fan belts, fan assemblies, faulty motor start and run capacitors and the like, as well as condenser fan malfunctions resulting from broken condenser fan blades, failed motors, capacitors, contactors, and the like. In liquid-fluid systems, defective pumps and pump motors can significantly reduce the rate of heat transfer in the VCC system and, if left unchecked, cause damage including destruction of the compressor. Faults typically occur quickly, typically within or during the compressor cycle, and if left unchecked can result in serious equipment damage beyond the fault itself and can in some cases create a fire hazard. System efficiency is usually seriously degraded by faults resulting in high energy cost with little benefit. It is generally desirable to shut the equipment down when these faults are detected.

One way to detect efficiency degradation in HVAC&R systems is by modeling the compressor input power for such systems under normal operating conditions and monitoring for deviations. An example of such compressor input power modeling is described in commonly-assigned U.S. Pat. No. 8,800,309, entitled "Method of Automatically Detecting an Anomalous Condition Relative to a Nominal Operating Condition in a Vapor Compression System," which is incorporated herein by reference in its entirety. The patent discloses, among other things, a method of detecting an anomalous condition in a vapor compression cycle based system. The method comprises automatically calculating a measured input power function that includes a current measured from a compressor unit of the vapor compression system (which includes a condenser unit) coupled to the compressor unit. The method further comprises receiving a temperature indicative of a condenser intake fluid temperature and automatically calculating an expected input power function that includes the condenser intake fluid temperature. If the expected input power function deviates from the measured input power function by more than a predetermined tolerance (e.g., due to refrigerant loss), then an indication that an anomalous condition exists in the vapor compression system is generated.

While existing techniques for detecting efficiency degradation and faults are satisfactory for their intended purposes, it will be appreciated that improvements are continually needed in the art of monitoring HVAC&R systems.

SUMMARY OF THE DISCLOSED EMBODIMENTS

The embodiments disclosed herein are directed to improved systems and methods for detecting efficiency degradation in vapor compression cycle based HVAC&R systems. The improved systems and methods can reliably and quickly detect efficiency degradation resulting from conditions such as loss of refrigerant, fan motor failures, evaporator frosting, and the like. The disclosed systems and methods advantageously use a compressor input power parameter model that can accurately predict an expected value for one or more power parameters of a compressor in the HVAC&R system.

The compressor input power parameter model may assume several different forms, including linear, non-linear (e.g., affine), quadratic, and the like, and generally comprises one or more fluid temperature measurements and a parametric value for at least one of the fluid temperature measurements. The fluid temperature measurements may include any suitable fluid temperature measurements and the parametric values may be derived or learned from the fluid temperature measurements and measurements of a compressor input power parameter, such as current (Amps), voltage (Volts), real power (Watts), reactive power (VARS), and/or apparent power (VA). The particular compressor input power parameters measured may depend on whether the model is being used to estimate the amount of power, current, or some other power parameter being input to the compressor.

In some embodiments, the model is a dynamic model that is continuously or regularly updated, which represents an improvement over existing solutions where the models remain static. The updates allow the model to account for or otherwise factor in any slow or long-term efficiency degradations in the HVAC&R system, for example, due to loss of refrigerant or other factors that may have developed in the system over time. The result is an up-to-date model of the system that represents the most current "expected" operating conditions of the system.

Short-term efficiency degradations in the system may then be detected by measuring one or more compressor input power parameters and comparing the measurements to the estimates produced by the dynamic model. Any deviations of the measured compressor input power parameters from the estimates produced by the dynamic model are therefore likely due to short-term degradations, such as fan motor failures, evaporator frosting, and the like. Deviations that are greater than a predefined threshold may be detected or otherwise flagged, an appropriate warning, which may include a notification signal, an audio/visual warning, and the like, may be issued indicating possible short-term degradations in the system, and in some cases action taken automatically to prevent damage to the system, including shutting the system down if needed to protect it.

Long-term efficiency degradations in the HVAC&R system, such as from loss of refrigerant due to leakage and similar causes, may also be detected using the model. The long-term degradations may be detected by tracking one or more of the time-varying parametric values of the model and monitoring for significant changes over time. If the one or more parametric values change by more than a predefined threshold amount from the previous values, an appropriate warning, which may again include a notification signal, an audio/visual warning, and the like, may be issued indicating possible long-term degradations in the system. The particular parametric values that are tracked and monitored depend on the particular form of the model being used, whether linear, nonlinear, quadratic, or another form.

In one example of an affine form, the model comprises three main components: a baseline compressor input power parameter component, a component that reflects the sensitivity of the compressor input power parameter to condenser intake fluid temperature, and a component that reflects the sensitivity of the compressor input power parameter to evaporator intake fluid temperature. In this example, the baseline compressor input power parameter component may be a constant, while the condenser intake fluid temperature sensitivity component may comprise a condenser sensitivity parameter multiplied by the condenser intake fluid temperature, and the evaporator intake fluid temperature sensitivity component may comprise an evaporator sensitivity parameter multiplied by the evaporator intake fluid temperature.

In some embodiments, an initial set of values may be established for the sensitivity parameters reflecting nominal operating condition when the system is in a new or well-maintained condition and there are no internal system errors or equipment faults. Alternatively, an initial set of values for these sensitivity parameters may be obtained from a manufacturer or installer that are derived statistically from similar or identical systems or equipment. Subsequent values for the sensitivity parameters may be derived or learned from updated fluid temperatures measurements and measurements of the compressor input power parameters. These updated measurements may be provided on an ongoing basis to produce a dynamic model that represents the most current "normal" operating conditions of the system.

In general, in one aspect, the disclosed embodiments are directed to a monitor for an HVAC&R system having a compressor, a condenser, and an evaporator. The monitor comprises a system temperature processor operable to obtain fluid temperature measurements for the condenser and fluid temperature measurements for the evaporator, the fluid temperature measurements for the condenser and the evaporator being obtained from temperature sensors located near the condenser and the evaporator, respectively, or from proxies of the fluid temperature measurements for the condenser and for the evaporator, respectively. The monitor further comprises a power parameter processor operable to obtain one or more power parameter measurements for the compressor using one or more current detection devices mounted on the compressor, respectively, and a compressor input processor operable to provide an estimate of a compressor input power parameter for the compressor using the fluid temperature measurements and the one or more power parameter measurements. The compressor input processor is configured to obtain updated fluid temperature measurements for the condenser and updated fluid temperature measurements for the evaporator from the system temperature processor, obtain updated one or more power parameter measurements from the power parameter processor, and provide an updated estimate of the compressor input power parameter for the compressor using the updated fluid temperature measurements and the updated one or more power parameter measurements. The compressor input processor is further configured to detect degradation of operational efficiency in the HVAC&R system using the updated estimate of the compressor input power parameter and the updated one or more power parameter measurements and issue a warning if degradation of operational efficiency in the HVAC&R system is detected. The warning may include an alert or notification signal, an audio/visual warning, and the like.

In general, in another aspect, the disclosed embodiments are directed to a method of detecting efficiency degradation in an HVAC&R system having a compressor, a condenser connected to the compressor, and an evaporator connected to the condenser. The method comprises obtaining fluid temperature measurements for the condenser and fluid temperature measurements for the evaporator, the fluid temperature measurements for the condenser and the evaporator being obtained from temperature sensors located near the condenser and the evaporator, respectively, or from proxies of the fluid temperature measurements for the condenser and the evaporator, respectively. The method additionally comprises obtaining one or more power parameter measurements for the compressor using one or more current detection devices mounted to detect current flowing into the compressor. The method also comprises estimating a compressor input power parameter for the compressor using the fluid temperature measurements and the one or more power parameter measurements and obtaining updated fluid temperature measurements for the condenser and updated fluid temperature measurements for the evaporator and updated one or more power parameter measurements. The method further comprises providing an updated estimate of the compressor input power parameter using the updated fluid temperature measurements and the updated one or more power parameter measurements, and detecting degradation of operational efficiency in the HVAC&R system using the updated estimate of the compressor input power parameter and the updated one or more power parameter measurements. A warning and/or signal is issued if degradation of operational efficiency in the HVAC&R system is detected.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

Figure 1:
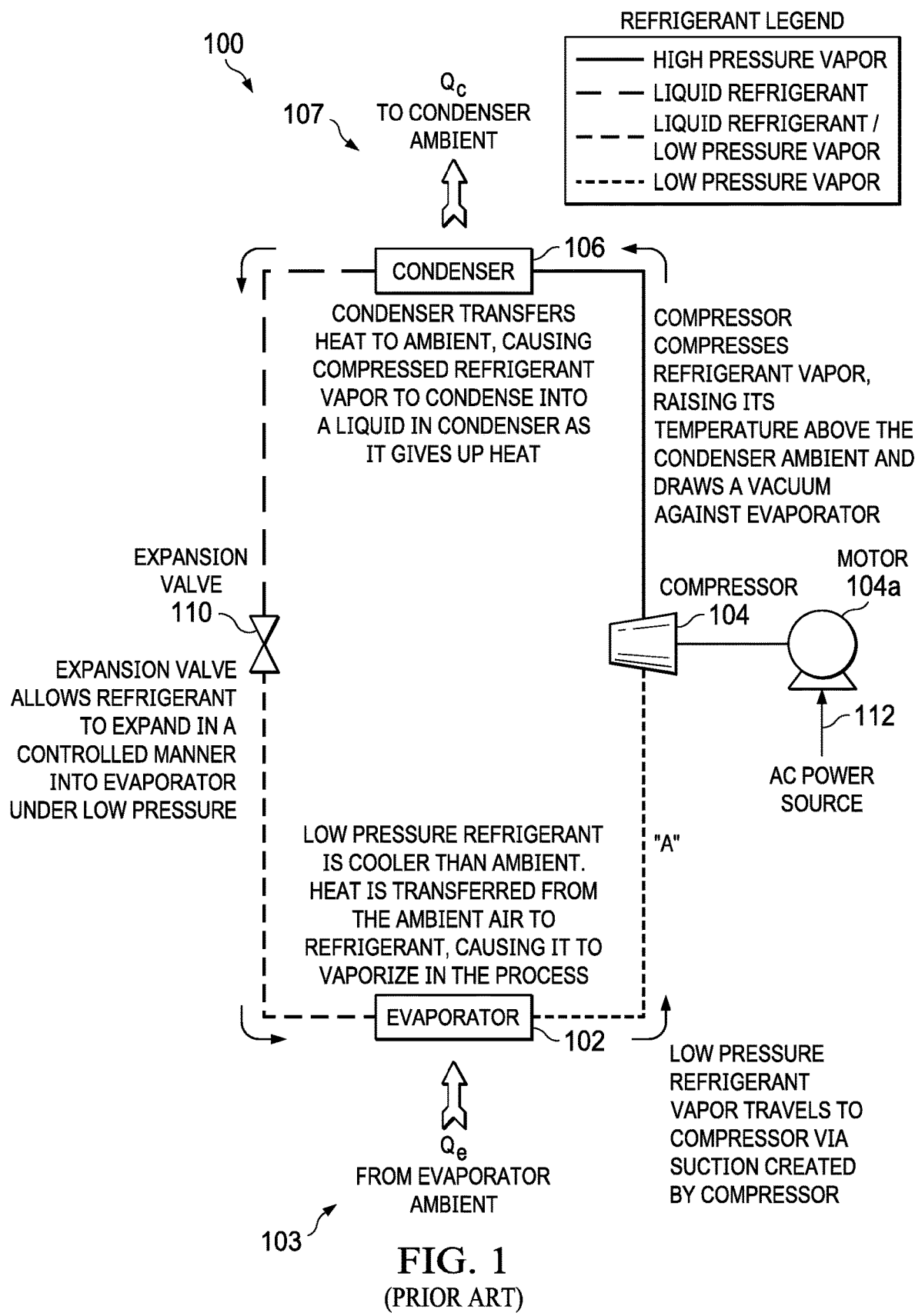
FIG. 1 illustrates a known HVAC&R system employing a vapor-compression cycle (VCC)

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

As mentioned above, the embodiments disclosed herein relate to systems and methods for detecting efficiency degradations in HVAC&R systems based on the vapor compression cycle (VCC). The disclosed systems and methods use a compressor input power parameter model that estimates one or more compressor input power parameters, such as current, voltage, real power, reactive power, and/or apparent power, using one or more fluid temperature measurements and a parametric value for at least one of the fluid temperature measurements. Such systems and methods may be used in any VCC based HVAC&R systems, including certain types of HVAC&R systems known as "direct-exchange" systems (e.g., residential air conditioning systems) where air is the fluid, as well as other types of HVAC&R systems including systems known as "indirect-exchange" systems (e.g., chillers or geothermal heat pumps) where water, anti-freeze, or other types of liquids is the fluid.

In some embodiments, the model is a dynamic model that is continuously or regularly updated to ensure the model reflects the most up-to-date operating condition of the system. The updates account for any long-term efficiency degradations in the HVAC&R system due to loss of refrigerant, for example, that may have developed in the system over time. This dynamic model may then be used to represent the current "expected" operating conditions for the system, even if performance is degraded by long-term effects such as refrigerant loss. Any measured compressor input power parameter, such as real power or current, that deviates from this dynamic model by more than a predefined threshold may then be flagged and an alert issued for possible short-term faults in the HVAC&R system (e.g., due to fan motor failures, evaporator frosting, etc.).

In some embodiments, the parametric values of the model may also be used to detect efficiency degradation in the HVAC&R system. In one form of the model, the model includes three main components: a baseline power component, a component reflecting the sensitivity of the compressor input power parameter to condenser intake fluid temperature, and a component reflecting the sensitivity of the compressor input power parameter to evaporator intake fluid temperature. These sensitivities may be initially derived or learned from measurements of more compressor input power parameters, including real power, reactive power, voltage, current, and the like, and certain air temperature measurements, such as condenser intake and evaporator intake fluid temperatures. Initial sensitivities may also be downloaded or otherwise obtained from an alternative source, such as an equipment manufacturer or distributor, as explained later herein. As the model is updated, the sensitivities may be tracked or monitored for significant changes in one or more of these sensitivities over time, such as the sensitivity to evaporator intake fluid temperature. If a change exceeds a predefined threshold, then an alert may be provided indicating the likely presence of long-term system efficiency degradations (e.g., due to refrigerant loss, etc.).

Referring now to FIG. 1, a flow diagram for a basic HVAC&R system 100 is shown employing a vapor compression cycle. Operation of the HVAC&R system 100 is well known in the art and will be described only generally here. Beginning at point "A" in the figure, refrigerant in the form of low pressure vapor is drawn via suction from an evaporator 102, which is essentially a heat exchanger that absorbs heat from a fluid (i.e., air) at the evaporator ambient 103 and transfers it to the refrigerant flowing within the evaporator to a compressor 104. The compressor 104 receives the low-pressure vapor, compresses it into a high-pressure vapor, and sends it toward a condenser 106, raising the temperature of the refrigerant to a temperature higher than that of the fluid (i.e., air in the case of a direct exchange system for example) of the condenser ambient 107 in the process. At that condenser 106, condenser coils (not expressly shown) allow the heat in the higher temperature vapor refrigerant to transfer to the lower temperature condenser ambient fluid, as indicated by arrow $Q_c$. This heat transfer causes the high-pressure vapor refrigerant in the condenser coils to condense into a liquid.

From the condenser 106, the liquid refrigerant enters an expansion valve 110 that atomizes the refrigerant and releases (i.e., sprays) it as an aerosol into the evaporator 102. The temperature of the liquid refrigerant drops significantly as it moves from the inlet side of the expansion valve 110 where it is under high pressure to the outlet side of the expansion valve 110 where it is under relatively low pressure.

At the evaporator 102, the reduced temperature of the refrigerant cools the evaporator coils (not expressly shown) to well below the temperature of the evaporator ambient fluid in a normally operating system, absorbing heat in the process and causing the refrigerant to evaporate into a vapor. Heat from the evaporator ambient fluid flows is subsequently absorbed by the evaporator coils (not expressly shown) in the process, as indicated by arrow $Q_e$. The low-pressure vapor in the evaporator is then pulled via suction into the compressor 104 at A, and the cycle repeats.

In FIG. 1, the compressor 104 is driven by a compressor motor 104a, the power for which is provided by an AC power source, such as a mains AC power line 112. As will be explained herein, one way to detect system degradation is by monitoring the input power actually consumed by the compressor motor 104a over the AC power line 112 and comparing that compressor input power to the compressor input power predicted by the dynamic model mentioned above. In general, if the comparison indicates the instantaneous compressor input power differs from the compressor input power predicted by the changing dynamic model by more than a predefined threshold amount, then that may be an indication of a short-term event, such as freezing evaporator coils, broken air handler fan belts or fan assemblies, faulty motor start and run capacitors, and the like.

Additionally, in accordance with the disclosed embodiments, one or more of the parametric values of the model may also be monitored and used to detect system degradation. It has been found that these parametric values can change significantly over time as the system evolves from a known good operational state to a degraded operational state. In general, if one or more of these parametric values change over time by more than a predefined threshold amount as the dynamic model as updated, then that may be an indication of a long-term event, such as loss of refrigerant, coil fouling and the like. Therefore, by continuously or regularly updating the model and the parametric values thereof and monitoring for changes in one or more of the parametric values, long-term system degradation may be detected.

As used herein, the terms "evaporator ambient fluid" and "condenser ambient fluid" refer to the fluid of the ambient environment surrounding the evaporator and condenser functions, respectively, which may be air in the case of a direct exchange system and a liquid in other cases. When the system 100 is operating in air conditioning mode or as a refrigerator, the evaporator ambient is the space to be cooled or "air conditioned" and is normally a building or room, but may also be the internal space of a refrigerator or freezer. In this mode, the condenser ambient is usually the outdoor environment in the case of an air conditioner and some refrigeration systems and may be the ambient external to the equipment in the case of refrigeration. In other words, a direct exchange air conditioner or refrigerator absorbs heat from the air of a conditioned space and rejects the heat to the outdoor or external environment. When the system 100 is operating as a heat pump in heating mode, the roles of the condenser 106 and evaporator 104 are reversed so that the condenser 106 functions to absorb heat from the nominally cooler outdoor environment and the evaporator 102 functions to deliver heat to the building or room being heated. Table 1 summarizes the direction of heat flow described above for air conditioning and heating systems based on the vapor compression cycle, such as the HVAC&R system 100 of FIG. 1.

TABLE 1

HVAC&R System Heat Flow

| System Function | Absorbs Heat From | Rejects Heat To |
|---|---|---|
| Air Conditioning Or Refrigeration (Including Freezer) | Conditioned Space | Outdoor or External Ambient |
| Heat Pump | Outdoor or External Ambient | Conditioned Space |

The HVAC&R system 100 of FIG. 1 is considered to be a "direct exchange" system in which heat is transferred directly to and from the air of the evaporator and condenser ambient environment by the evaporator 102 and condenser 106. However, the embodiments disclosed herein are also applicable to non-direct exchange systems, including "indirect exchange" systems, such as a chiller operating as an air conditioner, or a geothermal heat pump. In a chiller, the evaporator cools a fluid, such as cooling water, that is then transported throughout a building to independently cool the spaces therein through heat exchangers located remotely from the chiller. In some systems, heat is rejected from the condenser into a liquid fluid such as water or an anti-freeze solution, which is then transferred to a cooler ambient. Thus, the disclosed embodiments may be used with systems that transfer heat directly to and from the air of the intended spaces as in a conventional direct exchange system, or indirect exchange systems that transfer heat to or from a liquid fluid, such as water, which is then used to cool or heat the intended spaces. In what follows, the term "fluid temperature" when used to describe the intake or exhaust temperature of an evaporator or condenser (or the function thereof) will be understood to be air in the case of a direct exchange system and a liquid or fluid in the case of indirect exchange systems such as chillers. Mixed mode systems, such as a geothermal heat pump that uses water or anti-freeze to exchange heat with the ground and air to exchange heat inside the building, are also within the scope of the disclosed embodiments.

Figure 2:
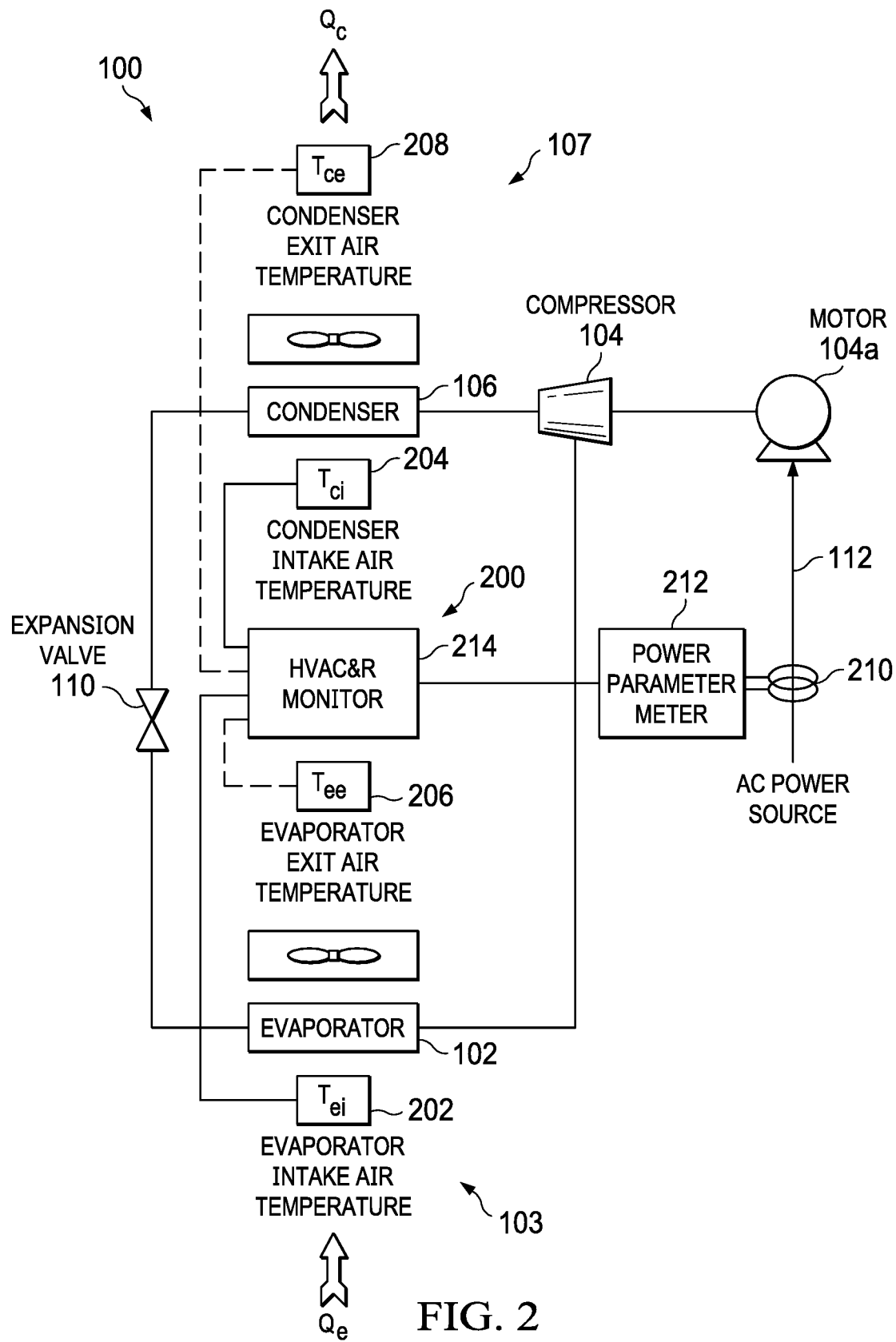
FIG. 2 illustrates an exemplary HVAC&R system having an HVAC&R monitor according to aspects of the disclosed embodiments.

Referring next to FIG. 2, an HVAC&R monitoring system 200 is shown in which the dynamic model herein may be implemented according to the disclosed embodiments. In this example, the monitoring system 200 is being used to monitor the HVAC&R system 100 of FIG. 1, which has now been equipped with a plurality of temperature sensors 202, 204, 206, and 208 and an HVAC&R monitor 214. In general, there are four temperatures that may be measured for the model: (i) a condenser intake fluid temperature $T_{ci}$; (ii) a condenser exhaust fluid temperature $T_{ce}$; (iii) an evaporator intake fluid temperature $T_{ei}$, generally referred to as the "return" temperature in commercial and residential direct exchange air conditioning; and (iv) an evaporator exhaust fluid temperature $T_{ee}$, generally referred to as the "supply" temperature in commercial and residential direct exchange air conditioning systems.

Although four temperatures are available, it has been discovered that the compressor input power parameter model can accurately estimate the compressor input power parameters using only two of the four temperatures: either the intake or exhaust fluid temperature of the evaporator ($T_{ei}$ or $T_{ee}$), and either the intake or exhaust fluid temperature of the condenser ($T_{ci}$ or $T_{ce}$), depending on the particular power parameter being estimated (e.g., power, current, etc.). For example, in one embodiment, the model may use the fluid temperature $T_{ei}$ at the intake of the evaporator 102 and the fluid temperature $T_{ci}$ at the intake of the condenser 106 to estimate the power parameter. Accordingly in one embodiment, a temperature sensor 202 is mounted at or near the intake of the evaporator 102 to measure the evaporator intake fluid temperature $T_{ei}$, and a second temperature sensor 204 is mounted at or near the intake of the condenser 106 to measure the condenser intake fluid temperature $T_{ci}$. Alternatively, the condenser exhaust fluid temperature $T_{ce}$ may be substituted for $T_{ci}$ or the evaporator exhaust fluid temperature $T_{ee}$ may substituted for $T_{ce}$ in some embodiments. In such embodiments, a third temperature sensor 206 may also optionally be mounted at the exhaust of the evaporator 102 to measure the evaporator exhaust fluid temperature $T_{ee}$, or a fourth temperature sensor 208 may also optionally be mounted at the exhaust of the condenser 106 to measure the condenser exhaust fluid temperature $T_{ce}$. These temperature sensors 202, 204, 206, and 208 may be any suitable temperature sensors known to those skilled in the art, including voltage-based temperature sensors that employ thermocouples or thermistor devices.

In addition to the intake fluid temperature measurements, measurements of a compressor input power parameter are also obtained for monitoring the system HVAC&R 100. Examples of compressor input power parameter measurements that may be obtained include measurements of current, voltage, real power, reactive power, and apparent power. As a practical matter, for measurements of real power, most power meters and other power measurement devices also need to measure current. Thus, compressor input current is almost always one of the compressor input power parameters measured. Similarly, for measurements of apparent power or reactive power, compressor input voltage also needs to be measured, in addition to other power parameters.

In a typical residential installation, the compressor 104 (and motor 104a) is fed by a mains AC power line 112, which may be a 3-wire single-phase power line having a mid-point neutral. Other configurations are also possible, including two-wire AC systems and 3-phase AC configurations. Thereafter, one or more current detection devices 210, such as one or more toroidal-type current transformers, may be mounted on the wires of the compressor power line 112. The outputs of the one or more current transformers 210 are then provided to a power parameter meter 212, which may be any commercially available power meter or a meter that can measure RMS current flowing through the power line 112. Some models of the power parameter meter 212 may also incorporate measurements of line voltage, such as models that measure real power and apparent power (Volt-Amps), in single or polyphase form. An example of a commercial power meter that may be used as the power parameter meter 212 is the POWERLOGIC® PM850 power meter from Schneider Electric USA, Inc. This meter is capable of continuously measuring, among other things, the real power, reactive power, apparent power, voltage, and current delivered to the compressor 104, provided the appropriate connections (e.g., voltage and current connections) are made to the meter.

In embodiments where the compressor input power parameter model is being used to estimate compressor input current, one or more current transformers and other current-measuring devices may be used instead of a power meter. Current-measuring devices are available that can provide an indication of the RMS current flowing through the power line 112 over a specified current range. Such current-measuring devices are particularly suited for use with a current-based model, as no mains voltage measurements are required in order to estimate compressor input current. In these embodiments, the RMS current delivered to the compressor 104 alone may suffice as the compressor input power parameter measurements for the model. An example of current-measuring device suitable for some HVAC&R applications is a Veris H923 split-core current sensor from Veris Industries that can provide a 0-10 Volt signal in response to a 0-10 Amp RMS current. Other similar current-measuring devices or systems may be employed, appropriate to the expected levels of current in the system.

The compressor input power parameter measurements may then be used along with either the intake or exhaust fluid temperature of the evaporator ($T_{ei}$ or $T_{ee}$), and either the intake or exhaust fluid temperature of the condenser ($T_{ci}$ or $T_{ce}$), to establish the model. In some embodiments, and by way of an example only, the particular fluid temperature measurements used may be measurements of the evaporator intake fluid temperature $T_{ei}$ and the condenser intake fluid temperature $T_{ci}$. This is the example depicted in FIG. 2. In other implementations, the fluid temperature measurements used may be measurements of the evaporator exhaust fluid temperature $T_{ee}$ and the condenser exhaust fluid temperature $T_{ce}$. In still other implementations, a combination of condenser intake and evaporator exhaust temperatures may be used, or a combination of condenser exhaust and evaporator intake temperatures may be used.

The fluid temperature measurements along with the compressor input power parameter measurements may then be provided to the HVAC&R monitor 214 for modeling the compressor input and detecting any system degradation. These measurements may be provided to the HVAC&R monitor 214 over any suitable signal connection, including wired (e.g., Ethernet, etc.), wireless (e.g., Wi-Fi, Bluetooth, etc.), and other connections. Such an HVAC&R monitor 214 may be integrated into a so-called "smart" thermostat or other programmable thermostat that is capable of being configured to input a plurality of data signals (e.g., analog, digital, etc.), executing an algorithm or software routine based on those data signals, and outputting one or more data signals (e.g., analog, digital, etc.). Other examples of commercially available devices that may be adapted for use as the HVAC&R monitor 214 are commercially available programmable logic controllers (PLC), and building management systems (BMS), both manufactured by Schneider Electric Co. Cloud-based solutions where a portion or all of the HVAC&R monitor 214 resides on a remote network location are also contemplated by the disclosed embodiments.

Figure 3:
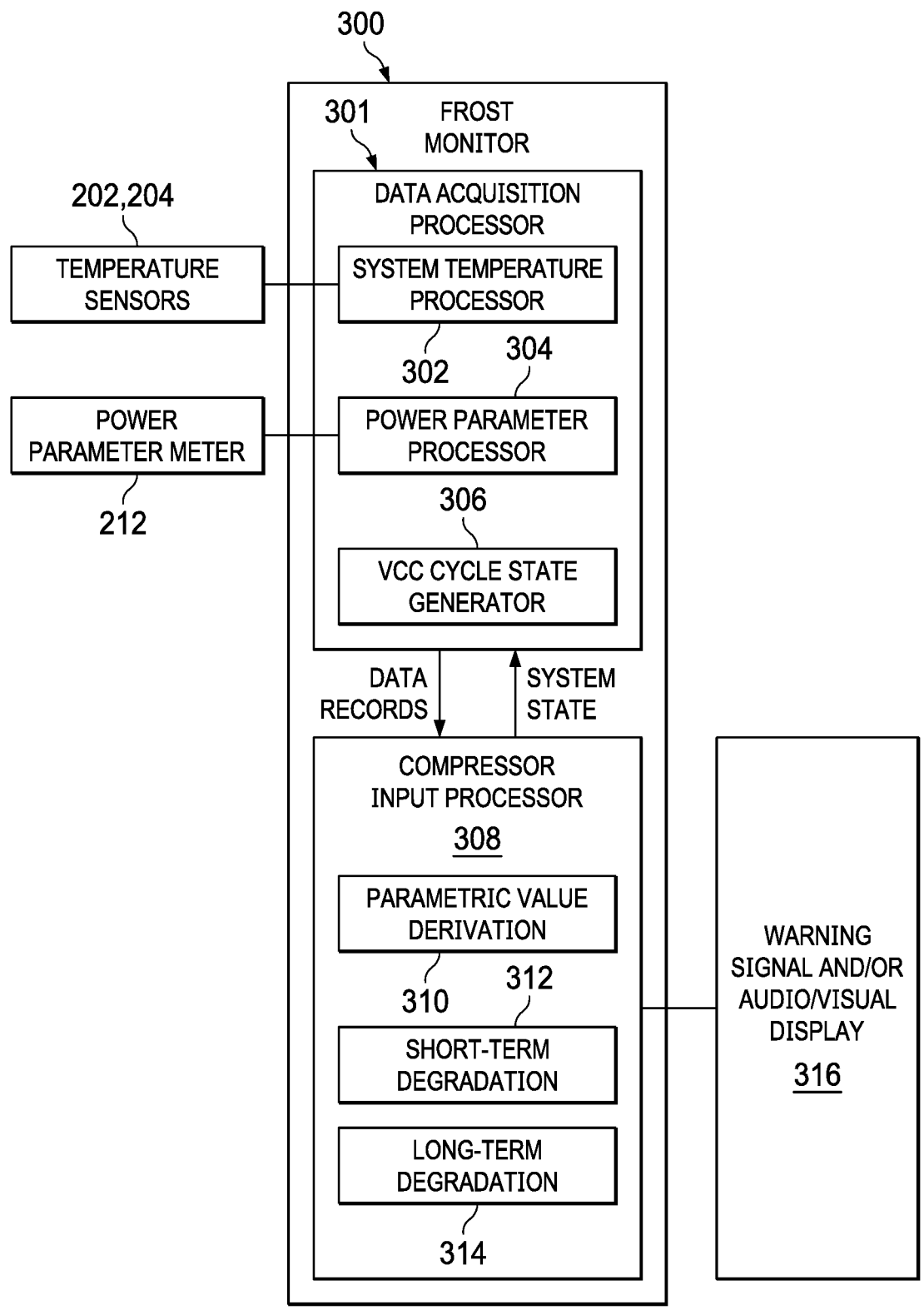
FIG. 3 illustrates an exemplary implementation of an HVAC&R monitor according to aspects of the disclosed embodiments.

FIG. 3 illustrates an exemplary implementation of an HVAC&R monitor 300 that may be used as the HVAC&R monitor 214 in FIG. 2. The HVAC&R monitor 300 may be composed of several processing circuits, including a data acquisition processor 301 and a compressor input processor 308, each processing circuit having a number of sub-processing circuits that are discussed in more detail further below. Each of these processing circuits 301 and 308 (and their sub-processing circuits) may be either a hardware based processing circuit (e.g., ASIC, FPGA, etc.), a software based processing routine (e.g., algorithm, etc.), or a combination of both hardware and software (e.g., microcontroller, etc.). In addition, while the processing circuits 301 and 308 (and their sub-processing circuits) are shown as discrete components, any of these components may be divided into several constituent components, or two or more of these components may be combined into a single component, without departing from the scope of the disclosed embodiments. Following is a description of the operation of the various processing circuits 301 and 308 (and their sub-processing circuits).

As used herein, the term "circuits" and "circuitry" may refer to one or more or all of the following: (a) hardware circuit implementations (such as implementations in analog and/or digital circuitry); (b) combinations of hardware circuits and software, such as a combination of analog and/or digital hardware circuit(s) with software/firmware, or any portions of hardware processors with software (such as digital signal processors), software, and memories that work together to cause a system, device, or apparatus to perform various functions); and (c) hardware circuits and or processors, such as a microprocessor or a portion of a microprocessor, that requires software (e.g., firmware) for operation, but the software may not be present when it is not needed for operation.

The data acquisition processor 301 operates to acquire and store fluid temperatures and power parameter values continuously and from these values and optionally other inputs, synthesizes HVAC&R system state information, and assembles and pre-processes them into data records that can be used by the compressor input processor 308. In the example shown, the data acquisition processor 301 includes a system temperature acquisition processor 302 which operates to acquire and store fluid temperature measurements for the model continuously or regularly. The data acquisition processor 301 also includes a power parameter acquisition processor 304 which acquires and stores measurements of one or more compressor input power parameters as measured by the power parameter meter 212 (see FIG. 2) continuously or regularly. These one or more compressor input power parameters may include real power, reactive power, apparent power, voltage, and current consumed by the compressor 104. Alternatively, as explained above, where the model is being used to predict compressor input current, measurement of the RMS current delivered to the compressor 104 by itself may suffice.

The data acquisition processor 301 assembles temperature estimates from the system temperature processor 302 and the power parameter processor 304 for inclusion in data records or tuples that represent the state of the equipment at a point or over an interval of time. Certain state information regarding the operation of the VCC cycle can be derived by observing the sequence of data measurements as they are made, and a VCC cycle state generator 306 is included to provide or synthesize this information.

Figure 4:
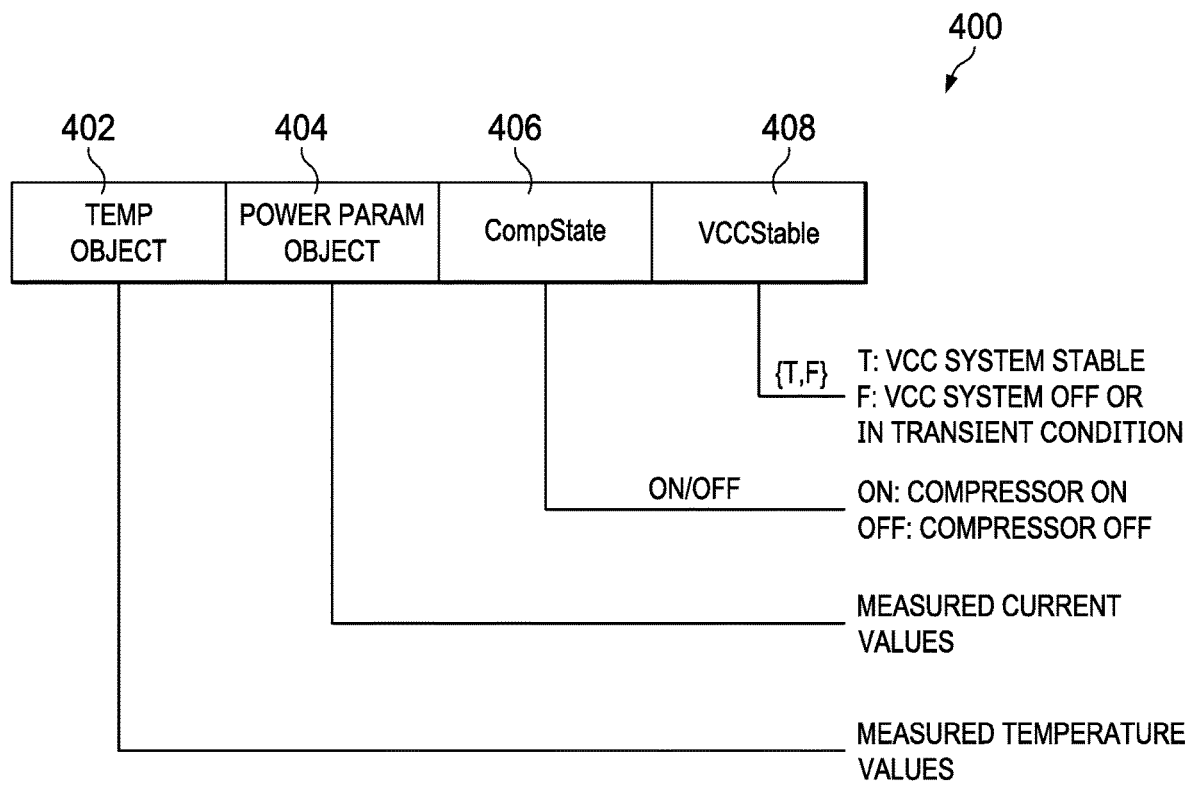
FIG. 4 illustrates an exemplary data record that may be used by a HVAC&R monitor according to aspects of the disclosed embodiments.

FIG. 4 provides an example of a data record 400 for a HVAC&R monitor according to the disclosed embodiments. One element of the exemplary data record 400 is a temperature object 402 comprising a collection of temperature measurements from the equipment taken proximately in time. In the present example, the fluid temperatures being measured and processed (or preprocessed) by the temperature acquisition processor 302 and incorporated in the temperature object 402 of the data record are the evaporator intake fluid temperature $T_{ei}$ and the condenser intake fluid temperature $T_{ci}$. These fluid temperature measurements are acquired from the temperature sensors 202 and 204 located at or near the evaporator and condenser intakes, as shown in FIG. 2. In other examples, the evaporator exhaust temperature $T_{ee}$ and the condenser exhaust temperature $T_{ce}$ may be the fluid temperature measurements acquired and preprocessed by the system temperature processor 302. Alternatively, room temperature measurements (e.g., from a thermostat) may be used as a proxy for measurements of the evaporator intake fluid temperature $T_{ei}$ rather than directly measuring the evaporator intake fluid temperature $T_{ei}$ in direct exchange air conditioning applications or as a proxy for the condenser intake fluid temperature $T_{ci}$ in heat pump applications and many refrigeration systems. In refrigeration applications (including freezers), the temperature of the internal compartment directly cooled by the evaporator may be used as a proxy for evaporator intake temperature. Other temperature proxies that track or are suitably responsive to the various intake and exhaust temperatures discussed herein may also be used without departing from the scope of the disclosed embodiments. These include, but are not limited to use of measured outdoor temperature or temperature estimates obtained from weather services or forecasts.

The data record 400 can include in some embodiments a temporally associated power parameter object 404, which comprises a measurement of one or more power parameters that were measured (by the power parameter meter 212) proximate in time to the measurements in the corresponding temperature object 402. An example of a power parameter than can be provided by the power parameter acquisition processor 304 of FIG. 3 and included in the data record of FIG. 4 is the compressor input current I. In some embodiments, the system temperature acquisition processor 302 and the power parameter acquisition processor 304 may provide processed or filtered values of these parameters, for instance, the average values of these parameters over a 10-second interval, or over the steady state portion of a compressor on-cycle (i.e., the period when the compressor is actively moving refrigerant through the HVAC&R system).

In some embodiments, the VCC cycle state generator 306 of the data acquisition processor 301 in FIG. 3 provides logic to augment the temperatures and power parameters of the data record of FIG. 4 with VCC system state information useful to the compressor input processor 308. For instance, in monitoring for system efficiency degradation, it can be useful to associate the state of the compressor (on or off) at the time of the temperature and power parameter measurements. The state of the compressor can often be obtained from an HVAC&R controller such as a thermostat, programmable logic controller, building management system, and the like that can expose the commanded on or off state of the compressor or compressors, but can also be inferred from monitoring a power parameter. In the example of FIG. 4, the state of the compressor {On or Off} at the time of the temperature and power parameter measurements is captured as the state variable CompState 406 in the data record 400.

Prediction of the compressor input power parameter using the embodiments described herein is most accurate after the VCC cycle has been operational long enough that refrigerant states have stabilized in the system. While the actual time required to stabilize refrigerant states can vary dependent upon the equipment, stabilization generally occurs within about 3-5 minutes of operation. For the VCC cycle state generator 306 that can detect whether the compressor is on or off, appropriate logic or circuitry may be implemented to synthesize a state variable indicating that the VCC cycle should be stable. As one example, logic may be implemented to declare the VCC cycle stable when the compressor has been detected on for longer than a contiguous interval of, for instance, 5 minutes. Otherwise, the VCC cycle can be declared not stable. To this end, a state variable VCCStable 408 may be included in the data record 400 shown in FIG. 4, which variable may be a Boolean variable that takes values in the set {True, False}, where the value "True" indicates that the VCC cycle is stable using logic similar or identical to that described. In this state, it can be expected that a properly trained compressor input power parameter model will accurately predict the power parameter(s) in the absence of significant frosting or other conditions that would cause system degradation. When the VCCStable state variable takes on the value "False," it means that either the VCC system is not operating (compressor is off), or that the compressor is on but the system has not been operational long enough for the refrigerant states to stabilize. In this False state, the compressor input power parameter model should not be trusted to provide an accurate prediction of the power parameter (which may be current in this example).

The data records 400 assembled by the data acquisition processor 301 are then provided to the compressor input processor 308 for use in monitoring the HVAC&R system, as shown in FIG. 3. From these data records, the compressor input processor 308 automatically derives or learns the parametric values needed for the model. In some embodiments, two or more versions of the model may be maintained, for example, one version based on data sets for a system operating in heating mode and another version based on data sets for a system operating in air conditioning mode. An optional system state variable can be maintained by the HVAC&R monitor indicating the present mode (heating or cooling) of the equipment. The compressor input processor 308 then uses the model to monitor for efficiency degradation in the system. If system degradation is detected, then the compressor input processor 308 may issue an alert or warning to the appropriate personnel via an audio/visual display 316 or other notification means. Such means may include signals to a programmable logic controller, refrigeration controller or building management system via hardwired or wireless connections.

In accordance with the disclosed embodiments, the compressor input processor 308 may include processing circuits that operate to derive or learn the model parametric values and monitor for efficiency degradation. For example, the compressor input processor 308 may include a parametric value derivation processor 310, a short-term degradation processor 312, and a long-term degradation processor 314. The parametric value derivation processor 310 is responsible for learning and maintaining the parametric values of a compressor input power parameter model used to predict the power parameter values. These processing circuits 310-314 work in conjunction with one another to enable the compressor input processor 308 to detect efficiency degradation in the HVAC&R system. In particular, the short-term degradation sub-processor 312 and the long-term degradation sub-processor 314 may operate either independently from each other, in parallel with one another, or both, to detect efficiency degradation in the system. Such an arrangement allows the compressor input processor 308 to detect either short-term degradation, long-term degradation, or both, in the HVAC&R system.

The parametric value derivation processor 310 functions to automatically derive or learn the parametric values for the model from data records received from the data acquisition processor 301. The parametric value derivation processor 310 may perform this function by automatically applying well-known numerical methods. For example, the parametric value derivation processor 310 may apply a parameter fitting method such as regression analysis or constrained optimization to a data set assembled by the parametric value derivation processor 310 from data records received from the data acquisition processor 301. In a typical arrangement, one or more data sets of data records processed (or preprocessed) as explained above are assembled over time by the parametric value derivation processor 310 from data records received from data acquisition processor 301 as training and validation data sets for purposes of "learning" appropriate parametric values of the one or more compressor input power parameter models. From these data sets, the parametric value derivation processor 310 automatically derives or learns the parametric values needed for the model. Preferably the one or more data set(s) used to derive or learn the parametric values was obtained while the system is in known good operating condition to ensure the best accuracy of the model.

In some embodiments, two or more versions of the model may be maintained, for example, one version based on data sets for a heat pump system operating in heating mode and another version based on data sets for the same system operating in air conditioning mode. The compressor input processor 308 then uses the model appropriate to the mode to monitor for efficiency degradation indicative of icing or frost conditions in the system. If such system degradation is detected, then the compressor input processor 308 may send an alert or warning to the appropriate personnel via an audio/visual display 316 or other notification means.

Figure 5:
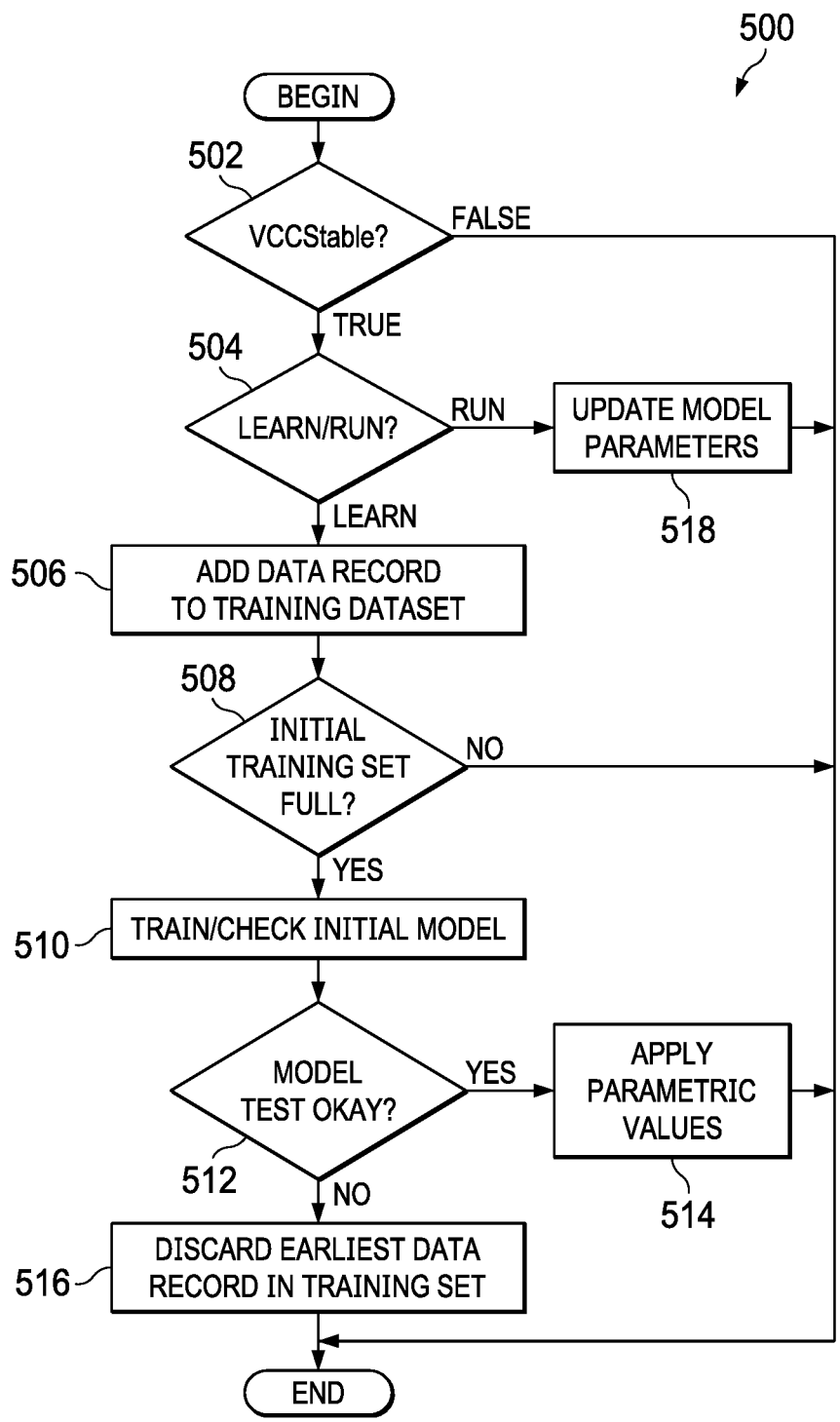
FIG. 5 illustrates an exemplary method that may be used to derive model parametric values according to aspects of the disclosed embodiments.

FIG. 5 shows a flow chart 500 describing an exemplary implementation of the parametric value derivation processor 310 in some embodiments. In general, the parametric value derivation processor 310 assembles a data set from the data records received from the data acquisition processor 301, then applies conventional curve-fitting techniques to the data set to derive initial parametric values. Referring to FIG. 5, upon entry to the flow chart with a new data record at decision block 502, the parametric value derivation processor 310 tests the state variables of the data record to determine whether data record may be used for training the model. In the example, to be a valid data record to facilitate model training, the data record should indicate that the VCC cycle is stable (VCCStable=True in FIG. 4), as this represents the pre-defined interval in which it has been determined by experiment or experience that the data record likely represents stable operation of the HVAC&R system. If this state variable is False, the present data record does not represent potential training data and the process exits normally.

Assuming the result of the testing in decision block 502 is True, the data record represents potential training data and control passes to decision block 504, which tests to see if the HVAC&R monitor is in a "Learn" or "Run" mode. Upon startup of the HVAC&R monitor, a LearnRun global state variable is set to the value "Learn," indicating that no parametric values for the model yet exists. If the LearnRun state variable has the value "Learn," the HVAC&R monitor has not yet learned the parametric values corresponding to the compressor input power parameter model, and decision block 504 passes control to process block 506. In process block 506, the parametric value derivation processor appends the data record to an initial data set, which is a collection of data records to be used in training the model. Then, in decision block 508, the size of the initial data set is checked to see if there are enough data records in the training set to train an initial model. If there are enough data records (the "Y" path from decision block 508), the parametric value derivation processor proceeds to train the model and check it to ensure it does an adequate job of modeling the training data. In some embodiments, as is common in machine learning applications, the initial data set is divided into a training data set and a validation data set, in which the parameters are derived using the training data set and the resulting parameters used to test the ability of the resulting model to accurately predict the power parameter values in the validation data set. In decision block 512, if the model is properly trained and validated, the model is declared ready for use to detect efficiency degradation (the "Y" path) and in process step 514, the parametric values are applied to the model and the LearnRun state variable is set to "Run." Assuming the HVAC&R equipment is in a known good or "newly maintained" state at this instant, the parametric values obtained at this transition point can be saved as a reference or static model to compare against to detect long-term degradation.

If in decision block 512, it is determined that the resulting model is not properly validated, the parametric value derivation processor continues to gather data records. In the example shown, it does so by discarding or "throwing out" the temporally oldest data record in the initial data set in process block 516 and the process is complete for the present data record.

Referring back to decision block 504 in FIG. 5, if the state variable Learn/Run has the value "Run," control passes to process block 518 where the parametric value derivation processor 310 can use the data record to update the model, resulting in a dynamic model. Once this modeling update is complete in process block 518, the routine ends normally.

Expanding on process block 510 (and 518) of FIG. 5, methods of regression analysis and curve fitting data to a specific model are well understood and numerous textbooks and references exist on the subject. Commercially available mathematical analysis software like MATLAB and programming languages like Python typically contain curve-fitting tools (e.g., "scipy.optimize.lsq_linear" for Python) that can readily perform the analysis when appropriately applied by a person skilled in the art of data analysis. These tools allow the parametric value derivation processor 310 to constrain the parametric values to within certain numerical ranges in order to ensure the resulting model makes sense from a physical, real world perspective. As an example of such a constraint, an increase in either evaporator or condenser intake fluid temperature should not result in a decrease in the magnitude of the compressor input power parameter. This implies that the parametric values should be non-negative in an affine form of the power parameter model, for example. Using such tools, a fit may be performed on the sets of data, for instance, to minimize mean-square error to obtain the parametric values for the model, possibly subject to constraints that may be placed on the parameters due to the physics of the system as appropriate.

Initially, the parametric value derivation processor 310 may derive or learn the parametric values from known data sets that are obtained under nominal operating condition (i.e., a stable system). These are data sets that are obtained when the HVAC&R system is new or well-maintained and there are no internal system errors or equipment faults. Such initial data sets allow the parametric value derivation processor 310 to establish initial starting points for the parametric values. In other implementations, it is also possible to use a default set of values as the starting points for the parametric values. Such a default set of values may be obtained, for instance, by statistical modeling of a group or series of similar or identical HVAC&R systems. In this case, the value of the Learn/Run state variable 504 can initially be set to "Run," and the parametric values updated using subsequent data records.

Expanding upon process block 518 in which the dynamic model is maintained, updated parametric values may be derived or learned by the parametric value derivation processor 310 using new data records or data sets from data acquisition processor 301. These updates may occur on a scheduled basis, such as every few seconds, minutes, hours, and the like, may occur as the result of an event, such as an interval following a defrost cycle, or they may occur on a real-time or near real-time basis as additional data becomes available. This helps ensure the model is up-to-date and reflects the current "normal" operating conditions of the system, including any slow or long-term degradations that may have developed in the system over time.

Updating the parameters of the dynamic model in process block 518 can take on many forms, including one in which the temporally oldest data record in the initial data set is replaced by the present record until all the data records in the initial data set have been replaced by new records, at which time a new initial data set is declared and the model is re-trained using this new initial data set. As an alternative, in systems in which the compressor cycles on and off to control temperature in what is commonly referred to as "bang-bang" control, the model parametric value derivation processor 310 may compute summary statistics comprising, for example, the mean measured temperature and mean compressor input power parameter over the "steady state" portion of a compressor on-cycle as a summary data record. Other variations on this approach are also contemplated, such as computing summary statistics on fixed-length subsets of samples of the temperatures and input power parameter values (e.g., 5-minute "chunks" of tuples of measurements, each taken at 1 second intervals.

As another alternative, the parametric value derivation processor 310 may implement one or more commonly-known adaptive filters, such as a recursive least squares (RLS) filter, in which the filter coefficients directly represent the parametric values of the model. An RLS filter of the appropriate form may be used to estimate the parametric values of the model without using all of the optimization techniques mentioned above. Such an RLS filter may be a particularly effective way to implement an adaptive filter in certain circumstances, for example, in controllers (e.g., PLC) with limited mathematical processing capability or memory. In this embodiment, the data acquisition processor 301 would provide the parametric value derivation processor 310 with filtered temperature and power parameter data records known or assumed to represent the system in a frost-free state. Care would need to be taken to filter the temperature and power parameter inputs to the model in order for its parametric values to not be too noisy, but these are skills well understood by designers of adaptive filters.

Other suitable updating schemes may also be used to update the model parametric values without departing from the scope of the disclosed embodiments. The particular updating scheme used in, which may change depending on the specific requirements of the implementation, is not overly important to the practice of the disclosed embodiment.

Turning now to the short-term degradation processor 312, this processor 312 operates to detect short-term efficiency degradations in the HVAC&R system, as the name suggests. The short-term degradation processor 312 may detect these efficiency degradations by applying the dynamic model to determine the expected values of one or more compressor input power parameters, then comparing the observed (i.e., measured) values of the compressor input power parameters to the expected values. If the comparison shows a reduction in the instantaneous observed compressor input power with respect to the predicted values, then this indicates a loss of heat absorption capacity by the system. If the comparison shows an increase in the instantaneous observed compressor input power with respect to the predicted values, then this indicates a loss of heat rejection capacity by the system.

In both cases above, the short-term degradation processor 312 takes advantage of the ability of the dynamic model to account for long-term degradations in the HVAC&R system in order to detect possible short-term efficiency degradations. Because slow or long-term efficiency degradations in the system are already accounted for in the model, any deviations from the model are likely due to short-term degradations. Such short-term degradations may arise from frosted or frozen evaporator coils as well as air handler fan malfunctions resulting from broken air handler fan belts, fan assemblies, faulty motor start and run capacitors, condenser fan malfunctions resulting from broken condenser fan blades, failed motors, capacitors, contactors, and the like. The short-term degradation processor 312 may detect these short-term degradation conditions by applying the dynamic model to determine the expected values of one or more compressor input power parameters, then comparing the observed (i.e., measured) values of the compressor input power parameters to the expected values. If the short-term degradation processor 312 detects any deviations of the observed values from the expected values beyond a predefined threshold amount, it may issue (or cause the compressor input processor 308 to issue) a warning to indicate a possible short-term efficiency degradation in the system. Thus, by deploying the dynamic model on an ongoing basis, the short-term degradation processor 312 is able to continuously or regularly monitor and detect possible short-term efficiency degradations in the system.

The long-term degradation processor 314, as the name suggests, functions to detect possible long-term efficiency degradations in the HVAC&R system. Such long-term degradations typically occur slowly over days, weeks, or months and may result from, for example, loss of refrigerant due to leakage and similar factors. The long-term degradation processor 314 may detect these long-term degradations by tracking one or more of the parametric values of the model and monitoring for changes over time. It has been discovered that long-term efficiency degradations like loss of refrigerant due to leakage may have a significant effect on the model parametric values. The particular parametric values that are affected may vary depending on the particular form of the model being used, including linear, nonlinear, quadratic, or another form. If the long-term degradation processor 314 detects any changes in the one or more parametric values over a predefined threshold amount from the previous values, it may issue (or cause the compressor input processor 308 to issue) an appropriate warning to indicate possible long-term degradations in the system. The parametric values that were saved as a reference or static model mentioned above may be used for comparison to detect the long-term degradation.

In general, the model comprises one or more fluid temperature measurements and a parametric value for at least one of the fluid temperature measurements. In one exemplary embodiment, the fluid temperature measurements are the evaporator and condenser intake temperature measurements $T_{ci}$ and $T_{ei}$ and the model is a compressor input power based model that is expressed in the form shown by Equation (1):

$$\hat{P}_c = p_0 + p_c T_{ci} + p_e T_{ei} \quad (1)$$

In Equation (1), $\hat{P}_c$ is the estimated compressor input power, $T_{ci}$ is the measured condenser intake fluid temperature in degrees, $T_{ei}$ is the measured evaporator intake fluid temperature in degrees, $p_0$ is the baseline power, $p_c$ is the sensitivity or dependency of the compressor input to the condenser intake fluid temperature, in Watts/degree, and $p_e$ is the sensitivity or dependency of the compressor input to evaporator intake fluid temperature in Watts/degree. These condenser and evaporator intake fluid temperatures $T_{ci}$ and $T_{ei}$ may be obtained from sensor measurements, whereas the parametric values $p_0$, $p_c$ and $p_e$ are derived or learned using the fluid temperature measurements $T_{ci}$ and $T_{ei}$ and the compressor input power parameter measurements. As new intake fluid temperature measurements and new measurements of the compressor input power become available, these measurements are used to derive or learn updated values for the parametric values $p_0$, $p_c$ and $p_e$ in the manner described above. Thus, the baseline power $p_0$, the condenser sensitivity parameter $p_c$, and the evaporator sensitivity parameter $p_e$ may change over time to reflect the expected compressor power under the present conditions including long term degradation. The change in the parametric values of $p_0$, $p_c$ and $p_e$ are a reflection of changing conditions within the HVAC&R equipment, such as refrigerant levels, level of coil fouling, motor condition, and the like. These conditions ideally should remain constant over time when the equipment is operating nominally and has been properly maintained, but may vary slowly over time as the equipment degrades due to slow refrigerant leaks, fouling of evaporator and condenser coils, and the like.

Note that Equation (1) assumes a steady state condition in the HVAC&R system where the refrigerant states are stable in the system. It has been determined empirically that an HVAC&R system is usually stable on the order of 3-10 minutes after a compressor run cycle begins. Therefore, in some embodiments, a delay of about 7 minutes, for example, may be imposed after the beginning of HVAC&R system operation to allow time for the system to stabilize until the model may be used to predict expected compressor input. Once the system is stabilized, it has been found that the model reflected in Equation (1) produces highly accurate predictions of compressor input power so long as internal system components and processes have not changed.

In accordance with the disclosed embodiments, the compressor input processor 308 and the short-term degradation processor 312 therein may apply the dynamic model expressed in Equation (1) to monitor and detect short-term degradations in the HVAC&R system. More particularly, the short-term degradation processor 312 may use the model to produce expected values for the compressor input power $\hat{P}_c$ on an ongoing basis and compare the expected values to the measured values for the compressor input power. If the actual values deviate from the expected values beyond a predefined threshold amount, for example, about 10%, the short-term degradation processor 312 may send (or cause the compressor input processor 308 to send) an alert to indicate a possible short-term efficiency degradation in the system. Other threshold amounts may of course be used, such as 7%, 15%, 20%, and the like, without departing from the scope of the disclosed embodiments.

Figure 6:
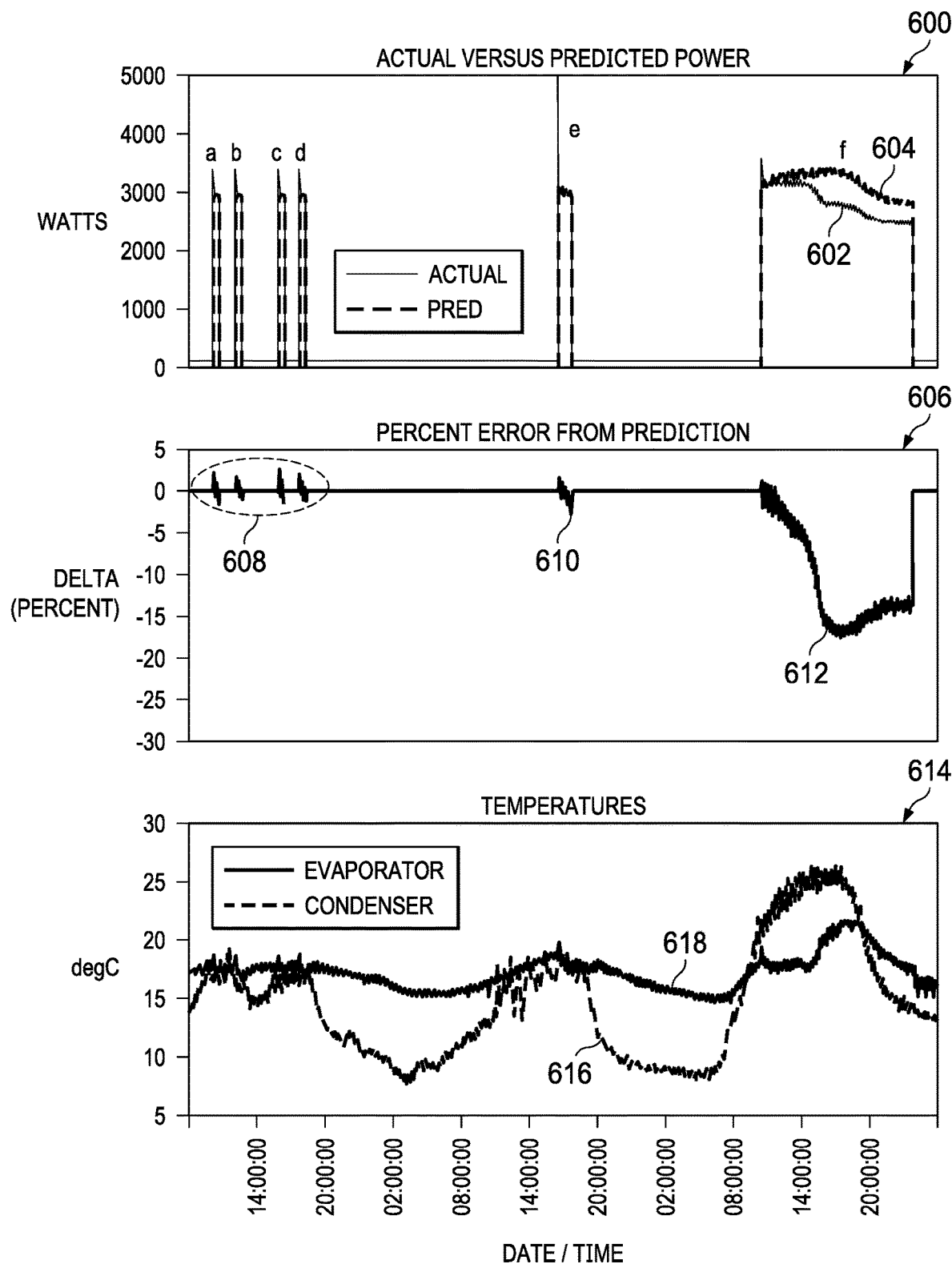
FIG. 6 is a chart comparing actual compressor input power versus expected compressor input power predicted by the HVAC&R monitor.

FIG. 6 graphically illustrates an example of how the short-term degradation processor 312 may employ the dynamic model expressed in Equation (1) to monitor and detect short-term degradation. In this example, the short-term degradation processor 312 is using the model to produce expected values of instantaneous compressor input power over a 66-hour operating interval. The short-term degradation processor 312 then compares these expected values to measurements of observed or actual compressor input power. The measurements in the example are obtained from a direct-exchange air conditioning system, so the temperatures represent air temperatures at the evaporator and condenser intakes.

Several charts are shown in FIG. 6, including a first chart 600 showing the actual power (line 602) consumed by the compressor versus $\hat{P}_c$, the predicted power (line 604) in Watts; a second chart 606 showing the percent difference or residual (line 608) between the actual and predicted power; and a third chart 614 showing the condenser intake fluid temperature (line 616) and evaporator intake fluid temperature (line 618) in degrees over the operating interval on which the predicted power values were based. Letters "a" through "f" in the first chart 600 denote intervals of compressor run time when the air conditioning system is actively cooling.

As the first chart 600 shows, the actual power consumed by the compressor (line 602) largely tracks the power predicted by the model (line 604) during run time intervals "a" through "e" to within less than 2% after a short initial transient start-up period while the system stabilizes. This less than 2% deviation can be seen more clearly at 608 and 610 in the second chart 606 and may indicate inefficient equipment operation, but there is little danger of catastrophic equipment failure, so the short-term degradation processor 312 need not send any alarms at this time. The deviation increases to about 15% at the next run time interval "f" (see 612), which may indicate the beginnings of or an in-progress short-term fault, such as the evaporator coils have frozen over. At this point, the short-term degradation processor 312 sends the alarm, as the cooling capability of the system is assumed to be near zero and the system should be shut down immediately to avoid equipment damage. When a short-term fault is detected by the short-term degradation processor 312, the temperature and power parameter measurements obtained during the fault interval are not used by the parametric value derivation processor 310 to update the dynamic model, as this data represents aberrant system behavior and not long-term system degradation.

In FIG. 6, the model used to monitor the compressor input was a power based model, as reflected in Equation (1). However, in some embodiments, it may be preferable to use a current based model instead of a power based model. The use of a current based model has certain practical benefits over the power based model. For example, in cases where the disclosed embodiments are retrofitted into an existing HVAC&R system, the measurement setup for measuring current is simpler and may be installed by an HVAC&R technician, whereas the measurement setup for measuring power generally requires a licensed electrician or engineer to install various protective measures, as understood by those skilled in the art. In cases where the disclosed embodiments are built in to the design of the HVAC&R system, a licensed electrician would not be needed, but the various electrical protections would still be required in order to obtain approval from an appropriate safety organization, for instance, UL (Underwriters Laboratories).

Accordingly, in some embodiments, the short-term degradation processor 312 may employ a current based model instead of the power based model of Equation (1). The current based model, like the power based model, is a dynamic model and generally comprises one or more fluid temperature measurements and a parametric value for at least one of the fluid temperature measurements. In one implementation, the current based model used by the short-term degradation processor 312 may be an RMS current based model, as reflected in Equation (2):

$$\hat{I}_{rms} = I_0 + k_c T_{ci} + k_e T_{ei} \qquad (2)$$

In Equation (2), $I_{rms}$ is the estimated compressor RMS current in Amps, $T_{ci}$ is the condenser intake fluid temperature, $T_{ei}$ is the evaporator intake fluid temperature, $I_0$ is the baseline RMS current, $k_c$ is the sensitivity of the RMS current to the condenser intake fluid temperature in Amps/degrees, and $k_e$ is the sensitivity of the RMS current to the evaporator intake fluid temperature in Amps/degrees. The condenser and evaporator intake fluid temperatures $T_{ci}$ and $T_{ei}$ may again be obtained from sensor measurements, as mentioned earlier. The current based parametric values $I_0$, $k_c$ and $k_e$ are analogous to their counterpart power based parametric values $p_0$, $p_c$ and $p_e$ for the power based model and may be automatically "learned" using regression analysis techniques in the manner described above with respect to $p_0$, $p_c$ and $p_e$ for the power based model. The short-term degradation processor 312 may therefore use the current based model in a similar manner to the power based model to monitor and detect short-term degradations in the system.

Both the current based model and the power based model discussed above represent linear forms of the model. As explained earlier, however, the model may assume other forms, including nonlinear and quadratic forms, so long as the model is dynamic and generally comprises one or more fluid temperature measurements and a parametric value for at least one of the fluid temperature measurements. An example of a quadratic form of the model shown in Equation (3):

$$I_{rms}^2 = K_0 + K_C T_c + K_R T_r + K_{C2} T_c^2 + K_{R2} T_r^2 + K_{CR} T_c T_r \qquad (3)$$

where $I^2_{rms}$ is the estimated square of compressor RMS current in amps$^2$, $K_0$ is the baseline value of $I^2_{rms}$ in amps$^2$, $K_C$ is the sensitivity of $I^2_{rms}$ to condenser intake temperature in amps$^2$/deg C., $K_R$ is the sensitivity of $I^2_{rms}$ to evaporator intake temperature in amps$^2$/deg C., $K_{C2}$ is the sensitivity of $I^2_{rms}$ to the square of condenser intake temperature in amps$^2$/(deg C.)$^2$, $K_{R2}$ is the sensitivity of $I^2_{rms}$ to the square of evaporator intake temperature in amps$^2$/(deg C.)$^2$, and $K_{CR}$ is the sensitivity of $I^2_{rms}$ to the product of condenser and evaporator intake temperature in amps$^2$/(deg C.)$^2$. Note that the quadratic model predicts the square of compressor RMS current and not simply the compressor RMS current (which may be obtained using the square-root of $I^2_{rms}$). The model also assumes that the line voltage remains constant and that the magnetizing current of the compressor motor 104a (see FIG. 1) may be modeled as a constant.

Figure 7:
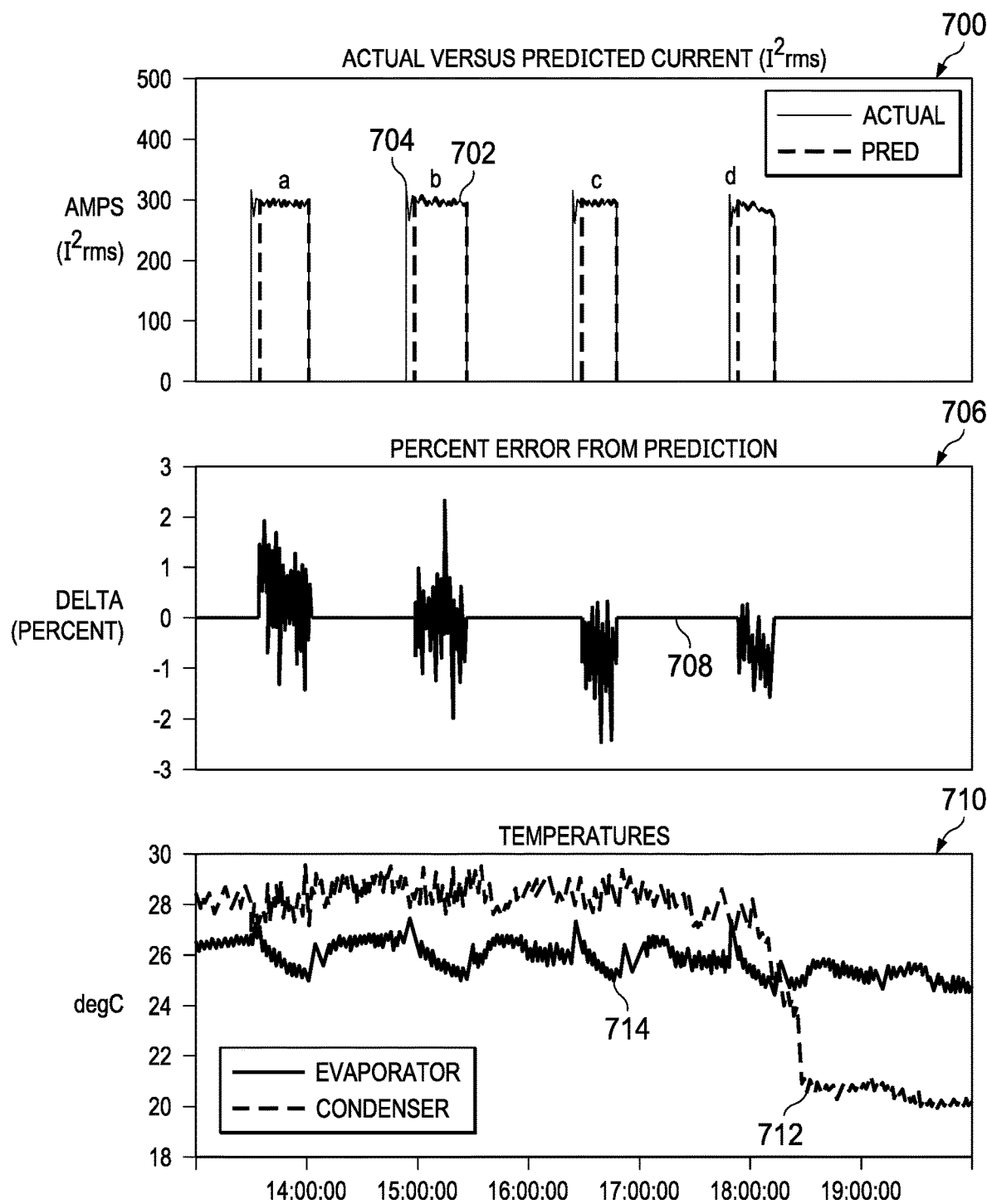
FIG. 7 is a chart comparing actual compressor input current versus expected compressor input current predicted by the HVAC&R monitor.

FIG. 7 graphically illustrates an example of how the short-term degradation processor 312 may employ the dynamic model expressed in Equation (3) to monitor and detect short-term degradation. In this example, the short-term degradation processor 312 is using the model to produce expected values of instantaneous compressor RMS current (or square thereof) over a 7-hour operating interval. The short-term degradation processor 312 then compares these expected values to measurements of observed or actual compressor RMS current (or square thereof). The measurements in the example are again obtained from a direct-exchange air conditioning system, so the temperatures again represent air temperatures at the evaporator and condenser intakes. As explained below, FIG. 7 illustrates an interval in time where there is no short-term degradation detected.

Several charts are again shown in the figure, including a first chart 700 showing the square of the actual RMS current (line 702) consumed by the compressor versus $I^2_{rms}$, the predicted square of the RMS current (line 704) in amps$^2$; a second chart 706 showing the percent difference or residual (line 708) between the actual and predicted RMS currents (or squares thereof); and a third chart 710 showing the condenser intake fluid temperature (line 712) and evaporator intake fluid temperature (line 714) over the compressor run time intervals "a" through "d" (see first chart 700).

As the first chart 700 shows, the actual power consumed by the compressor (line 702) largely tracks the power predicted by the model (line 704) to within about 2%. This roughly 2% deviation can be seen more clearly in the second chart 706 and may again be attributed to long-term efficiency degradation in the system, such as from loss of refrigerant. At this time, the short-term degradation processor 312 need not send an alarm yet, as equipment failure is not imminent. However, if the deviation increases, for example, to over 10% (not expressly shown), then this may indicate an in-progress short-term fault, such as the evaporator coils freezing over. At this point, the short-term degradation processor 312 sends the alarm to indicate the system should be shut down immediately to avoid equipment damage.

The same or similar models may also be used by the long-term degradation processor 314 to detect long-term efficiency degradations in the HVAC&R system. For detection of long-term degradation, as explained earlier, the long-term degradation processor 314 may track one or more of the parametric values of the model and monitor for changes over time. If any changes are detected in the one or more parametric values over a predefined threshold amount from the previous values, the long-term degradation processor 314 may issue an appropriate warning to indicate possible long-term degradations in the system.

Table 2 below shows an example of how the long-term degradation processor 314 may use the power base model of Equation (1) to detect long-term efficiency degradations in the HVAC&R system. The particular system reflected in Table 2 is a direct exchange system that has known refrigerant loss. The first column in the table represents the power based parametric values $p_0$, $p_c$ and $p_e$ for the model and the second column contains a description of each parametric value. Data Set A is an initial or at least an earlier data set containing about two and half weeks of condenser and evaporator intake fluid (air) temperature measurements and compressor input power parameter measurements obtained while the system is known to be operating in a well-maintained condition (i.e., the reference or static model mentioned above), while Data Set B is a newer or later data set containing about three weeks of condenser and evaporator intake fluid (air) temperature measurements and power parameter measurements obtained while the system is operating in an unknown condition.

TABLE 2

Dynamic Power Model

| Parameter | Description | Data Set A | Data Set B | Units | Change |
|---|---|---|---|---|---|
| $p_0$ | Baseline power | 1818.3 | 2119.0 | Watts | 14.2% |
| $p_e$ | Sensitivity to evaporator intake air temperature | 32.82 | 1.110 | W/deg C. | −96.6% |
| $p_c$ | Sensitivity to condenser intake air temperature | 47.80 | 49.92 | W/deg C. | −4.23% |

As can be seen, the value of the baseline power $p_0$ for Data Set A (as derived by the parametric value derivation processor 310) is 1818.3 Watts versus 2119.0 Watts for Data Set B. This represents a change of 14.2% and is within the same order of magnitude. The change may also be expressed as a ratio of the higher value to the lower value, which results in a multiple of 1.16. The value of the sensitivity to condenser intake fluid temperature parameter $p_c$ for Data Set A (as derived by the parametric value derivation processor 310) is 67.80 Watts/degrees versus 69.92 Watts/degrees for Data Set B. This represents a change of −4.23% and is also within the same order of magnitude. When expressed as a ratio of higher value to lower value, the change resulted in a multiple of 1.044. However, the value of the sensitivity to evaporator intake fluid temperature parameter $p_e$ for Data Set A (as derived by the parametric value derivation processor 310) is 32.82 Watts/degrees versus 1.110 Watts/degrees for Data Set B. This represents a decrease of 96.6%. Stated as a ratio of the earlier $p_e$ value to the later $p_e$ value, or 32.82/1.11, is 29.57, the update from Data Set A to Data Set B resulted in a decrease of almost 30 multiples.

In accordance with the disclosed embodiments, the long-term degradation processor 314 may monitor the values of one or more of the sensitivities to fluid temperature parameters to detect long-term efficiency degradations in the HVAC&R system. In the exemplary system of Table 2, the long-term degradation processor 314 may monitor the values of the sensitivity to evaporator intake fluid temperature parameter $p_e$ to detect long-term degradations in the system. Of course, other sensitivity parameters in the power based model may also be monitored without departing from the scope of the disclosed embodiments. In either case, if the long-term degradation processor 314 detects a change in the magnitude of sensitivity to evaporator intake fluid temperature parameter $p_e$ above a predefined amount, for example, 80% or more, then it may issue an appropriate warning to indicate possible long-term degradations in the system.

Table 3 below shows an example of how the long-term degradation processor 314 may use the current base model of Equation (2) to detect long-term efficiency degradations in the HVAC&R system. The system reflected in Table 3 is the same system used for Table 2 and is a system with known refrigerant loss. Data Set A and Data Set B are likewise the same data sets used for Table 2.

TABLE 3

Dynamic Current Model

| Parameter | Description | Data Set A | Data Set B | Units | Change |
|---|---|---|---|---|---|
| $I_0$ | Baseline current | 8.41 | 9.63 | Amps | 14.50% |
| $k_e$ | Sensitivity to evaporator intake air temperature | 0.13 | 0.02 | Amps/deg C. | −85.6% |
| $k_c$ | Sensitivity to condenser intake air temperature | 0.12 | 0.17 | Amps/deg C. | −7.76% |

As can be seen, the value of the baseline RMS current parameter $I_0$ for Data Set A (as derived by the parametric value derivation processor 310) is 8.41 Amps versus 9.63 Amps for Data Set B. This represents a change of 14.5% and is nearly the same as the percent change in Table 2. The value of the sensitivity $k_c$ of the RMS current to condenser intake fluid temperature parameter for Data Set A (as derived by the parametric value derivation processor 310) is 0.12 Amps/degrees versus 0.17 Amps/degrees for Data Set B. This represents a change of −7.76% and is also nearly the same as the percent change in Table 2. As for the value of the sensitivity $k_e$ of the RMS current to evaporator intake fluid temperature parameter, the value for Data Set A (as derived by the parametric value derivation processor 310) is 0.13 Amps/degrees versus 0.02 Amps/degrees for Data Set B. This represents a decrease of 85.6%, which tracks the significant percent change seen with the power based model in Table 2 for the sensitivity to evaporator intake fluid temperature parameter. The ratio of the earlier $k_e$ value to the later $k_e$ value, or 0.13/0.02, is 8.50, which likewise represents a decrease of several multiples as seen with the power based model in Table 2.

Based on the results in Table 3, the long-term degradation processor 314 may monitor the values of the sensitivity to evaporator intake fluid temperature parameter $k_e$ to detect long-term degradations in the system of Table 3. It is of course possible to monitor other sensitivity parameters in the current based model without departing from the scope of the disclosed embodiments. In any case, the long-term degradation processor 314 detects a change in the magnitude of this sensitivity parameter $k_e$ above a predefined threshold amount, such as 80% or more, then it may issue an appropriate warning to indicate possible long-term degradations in the system.

As can be seen from the foregoing, the HVAC&R monitor disclosed herein is capable of monitoring and detecting both short-term and long-term efficiency degradations using both a power based model and a current based model. The disclosed HVAC&R monitor may detect short-term efficiency degradations by continuously or regularly updating the models and comparing the estimates produced by the models against actual or observed values. Long-term degradations may be detected by monitoring one or more parametric values for the models for changes over time as the models are continuously or regularly updated. In particular, if the condenser intake fluid temperature sensitivity parameter and/or the evaporator intake fluid temperature sensitivity parameter changes (e.g., decreases) significantly over time from an initial or at least an earlier value, then that may be an indication that the system is suffering from a long-term efficiency degradation.

Figure 8:
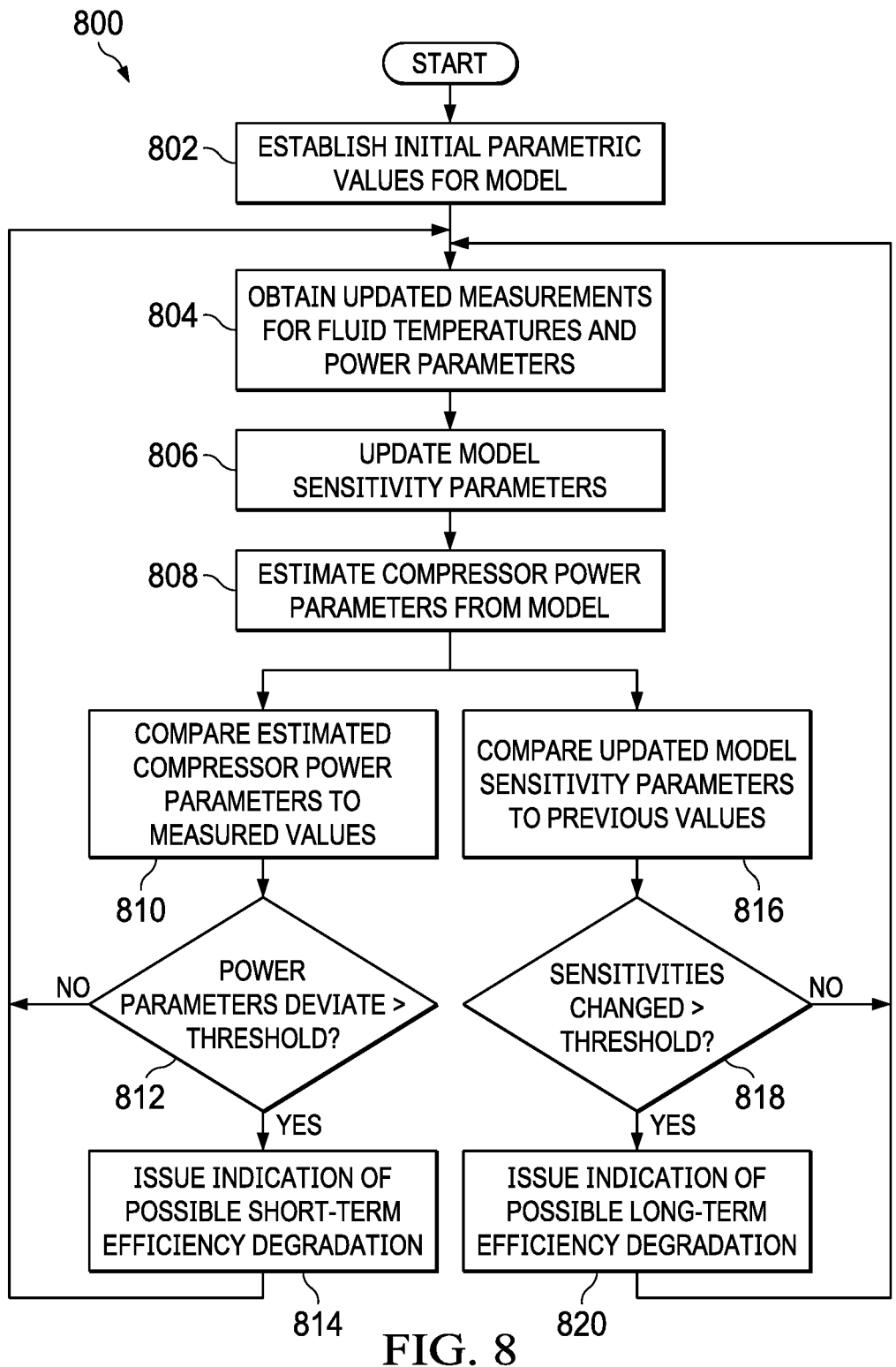
FIG. 8 illustrates an exemplary method that may be used by the HVAC&R monitor according to aspects of the disclosed embodiments.

FIG. 8 illustrates exemplary guidelines in the form of a flowchart 800 that may be implemented by the disclosed HVAC&R monitor to detect short-term and long-term efficiency degradations. The flowchart 800 generally begins at block 802, where the initial parametric values for the model are obtained. The HVAC&R monitor may derive or "learn" these initial parametric values from one or more initial data sets using, for example, regression analysis techniques. These data sets may contain measurements of evaporator and condenser fluid temperatures, such as evaporator and condenser air intake or exhaust temperatures, as well as measurements of one or more compressor input power parameters, such as real power, reactive power, apparent power, current, and voltage. Alternatively, the HVAC&R monitor may download or otherwise obtain previously stored parametric values for the system from a network, cloud storage, or other storage location (see FIG. 9).

At block 804, any updates to the measurements of the evaporator and condenser fluid temperatures as well as measurements of the power parameters are obtained and temporally organized as a measurement set. In the absence of an active indication of short-term efficiency degradation, as will be defined in block 814 subsequently, these measurements may then be used to update one or more model parametric values at block 806, such as the sensitivity of the compressor input power parameters to condenser fluid temperatures and the sensitivity of the compressor input power parameters to evaporator fluid temperatures, deferring or delaying application of a specific measurement set in time as needed to ensure the measurement set does not represent the equipment under short-term efficiency degradation. Thus, if short-term efficiency degradation is detected, it may be preferable to delay applying the new temperature and power parameter measurements as part of an update until it is clear that the measurements do not represent faulty behavior. The delay could be accomplished, for example, by queuing the measurement sets in a first-in/first-out queue of a fixed length. At block 808, the HVAC&R monitor uses the model to produce expected or estimated values for the one or more compressor input power parameters using the temperature values of the measurement set. The measurement set is then augmented with these estimated values for subsequent use. The HVAC&R monitor may then check for either short-term efficiency degradation, long-term efficiency degradation, or both in parallel depending on the setup of the particular system.

To check for short-term degradation, the HVAC&R monitor compares the estimated compressor input power parameters of the set above to the associated measured input power parameter values thereof at block 810. At block 812, the HVAC&R monitor determines whether the measured power parameter value of the measurement set deviate from the associated estimated power parameter value by more than a predefined threshold amount. In some embodiments, the threshold amount may be 10%, 15%, 20%, 25%, and the like depending on whether a power based model or a current based model is used. If the determination at block 812 is no, then the HVAC&R monitor returns to block 804 to obtain additional updated measurements of fluid temperatures and compressor input power parameters. If the determination at block 812 is yes, then the HVAC&R monitor issues a warning or other notification of possible short-term efficiency degradation at block 814. Such a warning or notification may be in any suitable form known to those skilled in the art, including various audio/visual alarms locally and/or remotely located from the system, e-mail and/or text messages to the occupants (or accounts thereof), as well as messages to a remote logging/monitoring facility. Or the warning can be used as software or hardware signals to trigger actions in automated systems, for example, a PLC or Building Management System, to shut down the HVAC&R system and alert designated personnel. Having taken the appropriate action, the HVAC&R monitor returns to block 804 to obtain additional updated measurements of fluid temperatures and compressor input power parameters.

To check for long-term degradation, the HVAC&R monitor compares the updated model sensitivity parameters to previous values thereof at block 816. At block 818, the HVAC&R monitor determines whether the updated model sensitivity parameters deviate from the previous values thereof by more than a predefined threshold amount. In some embodiments, the threshold amount may be a percentage change of 70%, 80%, 90%, or more, or alternatively a ratio of 2:1, 3:1, 6:1 or more, and may depend on whether a power based model or a current based model is used. If the determination at block 818 is yes, then the HVAC&R monitor issues a warning or other notification of possible long-term efficiency degradation in the manner described above. If the determination at block 818 is no, then the HVAC&R monitor returns to block 804 to obtain additional updated measurements of fluid temperatures and compressor input power parameters.

Figure 9:
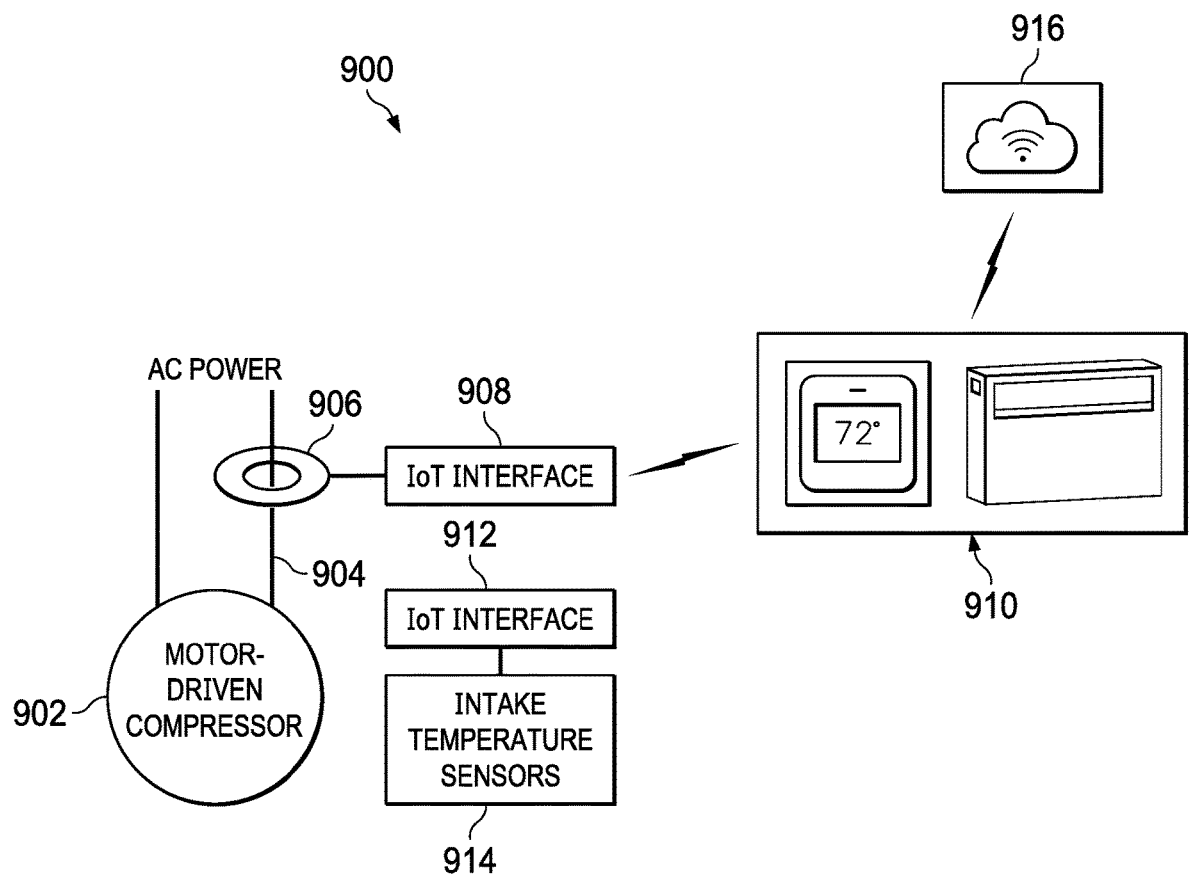
FIG. 9 illustrates another exemplary HVAC&R system having an HVAC&R monitor according to aspects of the disclosed embodiments.

FIG. 9 is a partial view of an HVAC&R system 900 according to the disclosed embodiments in which data is transferred wirelessly, for example, using the Internet of Things (IoT). As with other HVAC&R systems discussed herein, the system 900 includes a motor-driven compressor 902, the power for which is provided over a mains AC power line 904. A current transformer 906, such as a split-core current transformer, may be mounted around the power line 904 to detect the current delivered to the compressor 902. Such a split-core current transformer 906 may typically be installed by an HVAC&R technician instead of a licensed electrician. The current transformer 906 may include, or may be connected to, an IoT interface 908 having wireless data transmission capability. This IoT interface 908 may then transmit the current detected by the current transformer 906 to a smart HVAC&R controller 910 that uses the current to estimate the amount of power consumed by the compressor 902. The smart HVAC&R controller 910 may then check for short-term system efficiency degradation, long-term system efficiency degradation, or both in the manner described herein. The same IoT interface 908 or a similar IoT interface 912 may be connected to one or more temperature sensors 914 in the system, such as those used to measure the condenser and evaporator intake fluid temperatures (see FIG. 2). The temperature readings collected by the IoT interface 912 may then be transmitted to the smart HVAC&R controller 910 for further processing as described above. In some embodiments, both the current and the temperature readings collected by the IoT interfaces 908 and 912 may also be transmitted and stored on a network 916, such as a cloud-based network. The smart HVAC&R controller 910 may then access the network 916 to retrieve the readings, and may likewise store or otherwise make other data (e.g., system on time, system off time, error status, etc.) available on the network 916.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the invention as defined in the appended claims.

What is claimed is:

1. A monitor for a heating, ventilating, air conditioning and refrigeration (HVAC&R) system having a compressor, a condenser, and an evaporator, comprising:

a system temperature processor operable to obtain fluid temperature measurements for the condenser and fluid temperature measurements for the evaporator, the fluid temperature measurements for the condenser and the evaporator being obtained from temperature sensors located near the condenser and the evaporator, respectively, or from proxies of the fluid temperature measurements for the condenser and for the evaporator, respectively;

a power parameter processor operable to obtain one or more power parameter measurements for the compressor using one or more current detection devices mounted on the compressor, respectively; and a compressor input processor operable to provide an estimate of a compressor input power parameter for the compressor using the fluid temperature measurements and the one or more power parameter measurements;

wherein the compressor input processor is configured to obtain updated fluid temperature measurements for the condenser and updated fluid temperature measurements for the evaporator from the system temperature processor, obtain updated one or more power parameter measurements from the power parameter processor, and provide an updated estimate of the compressor input power parameter for the compressor using the updated fluid temperature measurements and the updated one or more power parameter measurements, the compressor input processor further configured to detect degradation of operational efficiency in the HVAC&R system using the updated estimate of the compressor input power parameter and the updated one or more power parameter measurements and issue a warning and/or signal if degradation of operational efficiency in the HVAC&R system is detected.

2. The monitor of claim 1, wherein the compressor input processor is configured to detect degradation of operational efficiency in the HVAC&R system by comparing the updated estimate of the compressor input power parameter to the updated one or more power parameter measurements and issue a short-term efficiency degradation signal if the updated one or more power parameter measurements deviate from the updated estimate of the compressor input power parameter by more than a predefined amount.

3. The monitor of claim 1, wherein the compressor input power parameter comprises one of a power delivered to the compressor or a current delivered to the compressor.

4. The monitor of claim 3, wherein the compressor input processor estimates the compressor input power parameter by modeling the compressor input power parameter using a baseline power component and at least one fluid temperature sensitivity component.

5. The monitor of claim 4, wherein the at least one fluid temperature sensitivity component comprises at least one sensitivity parameter multiplied by at least one fluid temperature measurement, the at least one sensitivity parameter indicating a sensitivity of the compressor input power parameter to the at least one fluid temperature measurements.

6. The monitor of claim 5, wherein the at least one sensitivity parameter comprises a condenser sensitivity parameter that indicates a sensitivity of the compressor input power parameter to the fluid temperature measurements for the condenser and an evaporator sensitivity parameter that indicates a sensitivity of the compressor input power parameter to the fluid temperature measurements for the evaporator.

7. The monitor of claim 5, wherein the at least one fluid temperature measurements includes one or more of condenser intake fluid temperature measurements and condenser exhaust temperature measurements and one or more of evaporator intake fluid temperature measurements and evaporator exhaust temperature measurements.

8. The monitor of claim 5, wherein the compressor input processor is further configured to derive the at least one sensitivity parameter using the at least one fluid temperature measurement and the one or more power parameter measurements and derive at least one updated sensitivity parameter using at least one updated fluid temperature measurement and the updated one or more power parameter measurements.

9. The monitor of claim 8, wherein the compressor input processor is configured to detect degradation of operational efficiency in the HVAC&R system by comparing the at least one sensitivity parameter to the at least one updated sensitivity parameter and issue a long-term efficiency degradation warning and/or signal if the at least one sensitivity parameter differs from the at least one updated sensitivity parameter by more than a predefined amount.

10. The monitor of claim 1, wherein the one or more power parameters include a current of the compressor, a voltage of the compressor, real power of the compressor, apparent power of the compressor, or reactive power of the compressor.

11. A method of detecting efficiency degradation in a heating, ventilating, air conditioning and refrigeration (HVAC & R) system having a compressor, a condenser connected to the compressor, and an evaporator connected to the condenser, the method comprising:
  obtaining fluid temperature measurements for the condenser and fluid temperature measurements for the evaporator, the fluid temperature measurements for the condenser and the evaporator being obtained from temperature sensors located near the condenser and the evaporator, respectively, or from proxies of the fluid temperature measurements for the condenser and the evaporator, respectively;
  obtaining one or more power parameter measurements for the compressor using one or more current detection devices mounted to detect current flowing into the compressor;
  estimating a compressor input power parameter for the compressor using the fluid temperature measurements and the one or more power parameter measurements;
  obtaining updated fluid temperature measurements for the condenser and updated fluid temperature measurements for the evaporator and updated one or more power parameter measurements;
  providing an updated estimate of the compressor input power parameter using the updated fluid temperature measurements and the updated one or more power parameter measurements;
  detecting degradation of operational efficiency in the HVAC&R system using the updated estimate of the compressor input power parameter and the updated one or more power parameter measurements; and
  issuing a signal if degradation of operational efficiency in the HVAC&R system is detected.

12. The method of claim 11, wherein detecting degradation of operational efficiency in the HVAC&R system comprises comparing the updated estimate of the compressor input power parameter to the updated one or more power parameter measurements and issuing a short-term efficiency degradation warning and/or signal if the updated one or more power parameter measurements deviate from the updated estimate of the compressor input power parameter by more than a predefined amount.

13. The method of claim 11, wherein the compressor input power parameter comprises one of a power delivered to the compressor or a current delivered to the compressor.

14. The method of claim 13, wherein estimating the compressor input power parameter comprises modeling the compressor input power parameter using a baseline power component and at least one fluid temperature sensitivity component.

15. The method of claim 14, wherein the at least one fluid temperature sensitivity component comprises at least one sensitivity parameter multiplied by at least one fluid temperature measurement, the at least one sensitivity parameter indicating a sensitivity of the compressor input power parameter to the at least one fluid temperature measurements.

16. The method of claim 15, wherein the at least one sensitivity parameter comprises a condenser sensitivity parameter that indicates a sensitivity of the compressor input power parameter to the fluid temperature measurements for the condenser and an evaporator sensitivity parameter that indicates a sensitivity of the compressor input power parameter to the fluid temperature measurements for the evaporator.

17. The method of claim 15, wherein the at least one fluid temperature measurements includes one or more of condenser intake fluid temperature measurements and condenser exhaust temperature measurements and one or more of evaporator intake fluid temperature measurements and evaporator exhaust temperature measurements.

18. The method of claim 15, further comprising deriving the at least one sensitivity parameter using the at least one fluid temperature measurement and the one or more power parameter measurements and deriving at least one updated sensitivity parameter using at least one updated fluid temperature measurement and the updated one or more power parameter measurements.

19. The method of claim 11, wherein detecting degradation of operational efficiency in the HVAC&R system comprises comparing the at least one sensitivity parameter to the at least one updated sensitivity parameter and issuing a long-term efficiency degradation warning and/or signal if the at least one sensitivity parameter differs from the at least one updated sensitivity parameter by more than a predefined amount.

20. The method of claim 11, wherein the one or more power parameters include a current of the compressor, a voltage of the compressor, real power of the compressor, apparent power of the compressor, or reactive power of the compressor.

* * * * *